(12) United States Patent
Horst

(10) Patent No.: US 7,057,323 B2
(45) Date of Patent: Jun. 6, 2006

(54) MODULAR FLUX CONTROLLABLE PERMANENT MAGNET DYNAMOELECTRIC MACHINE

(75) Inventor: Gary E. Horst, Manchester, MO (US)

(73) Assignee: Emerson Electric Co., St. Louis, MO (US)

( * ) Notice: Subject to any disclaimer, the term of this patent is extended or adjusted under 35 U.S.C. 154(b) by 48 days.

(21) Appl. No.: 10/400,966

(22) Filed: Mar. 27, 2003

(65) Prior Publication Data
US 2004/0189132 A1 Sep. 30, 2004

(51) Int. Cl.
*H02K 1/00* (2006.01)

(52) U.S. Cl. .................................. 310/191; 310/209

(58) Field of Classification Search ............... 310/191, 310/209, 156.56, 112, 114
See application file for complete search history.

(56) References Cited

U.S. PATENT DOCUMENTS

| | | | | |
|---|---|---|---|---|
| 2,796,542 A | 6/1957 | Beckey et al. | .............. | 310/162 |
| 3,411,027 A * | 11/1968 | Rosenberg | .................. | 310/181 |
| 4,568,846 A | 2/1986 | Kapadia | ...................... | 310/156 |
| 4,654,551 A | 3/1987 | Farr | ........................ | 310/112 |
| 4,757,224 A | 7/1988 | McGee et al. | .............. | 310/181 |
| 4,766,362 A | 8/1988 | Sadvary | ...................... | 322/50 |
| 4,916,346 A | 4/1990 | Kliman | ...................... | 310/156 |
| 4,939,398 A | 7/1990 | Lloyd | ...................... | 310/156.53 |
| 5,177,391 A | 1/1993 | Kusase | ...................... | 310/263 |
| 5,369,325 A * | 11/1994 | Nagate et al. | .......... | 310/156.54 |
| 5,504,382 A | 4/1996 | Douglass et al. | | |
| 5,530,307 A | 6/1996 | Horst | ........................ | 310/156 |
| 5,679,995 A | 10/1997 | Nagate et al. | ......... | 310/156.54 |
| 5,693,995 A * | 12/1997 | Syverson | ...................... | 310/114 |
| 5,864,191 A * | 1/1999 | Nagate et al. | .......... | 310/156.54 |
| 5,945,760 A | 8/1999 | Honda et al. | ............... | 310/156 |
| 6,087,751 A | 7/2000 | Sakai | ........................ | 310/156 |
| 6,097,124 A | 8/2000 | Rao et al. | | |
| 6,211,593 B1 | 4/2001 | Nashiki | ...................... | 310/156 |
| 6,218,753 B1 * | 4/2001 | Asano et al. | ........... | 310/156.53 |
| 6,353,275 B1 | 3/2002 | Nishiyama | ............. | 310/156.53 |
| 6,582,207 B1 * | 6/2003 | Matsumoto et al. | ..... | 417/410.1 |
| 6,700,279 B1 * | 3/2004 | Uchiyama et al. | .......... | 310/190 |

FOREIGN PATENT DOCUMENTS

| | | |
|---|---|---|
| EP | 0326088 | 8/1989 |
| EP | 0 552 365 | 7/1993 |
| GB | 1171541 | 11/1969 |
| JP | 2000134891 | 5/2000 |

* cited by examiner

*Primary Examiner*—Darren Schuberg
*Assistant Examiner*—Nguyen Hanh
(74) *Attorney, Agent, or Firm*—Harness, Dickey & Pierce, P.L.C.

(57) ABSTRACT

A modular assembly for an electromagnetic machine is disclosed. The modular assembly includes a rotor assembly and a flux controlling assembly. The rotor assembly has a shaft and has a plurality of rotor laminations mounted on the shaft. The rotor laminations define at least four salient rotor poles. At least one permanent magnet is embedded in each of at least two of the salient rotor poles. The flux assembly has a stationary coil disposing about the shaft for controlling flux of the disclosed machine. The flux assembly also has a cage supported on the rotor assembly for transferring flux between the at least two salient rotor poles with embedded magnets and the coil. In one embodiment, a support member is mounted on the shaft and supports the cage thereon. In another embodiment, a support member is connected between the cage and the at least two rotor poles with embedded magnets.

52 Claims, 18 Drawing Sheets

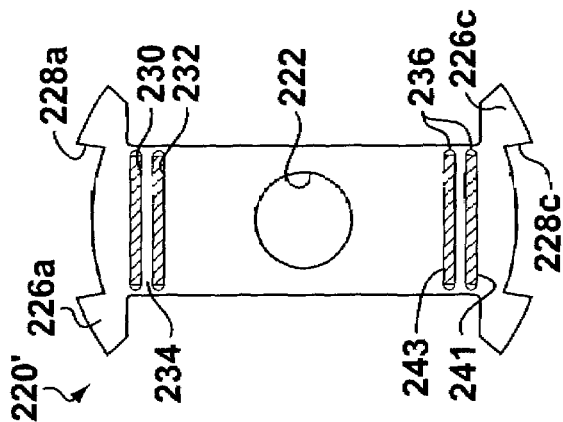
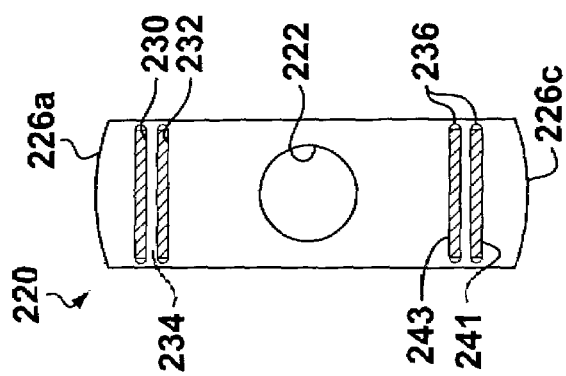
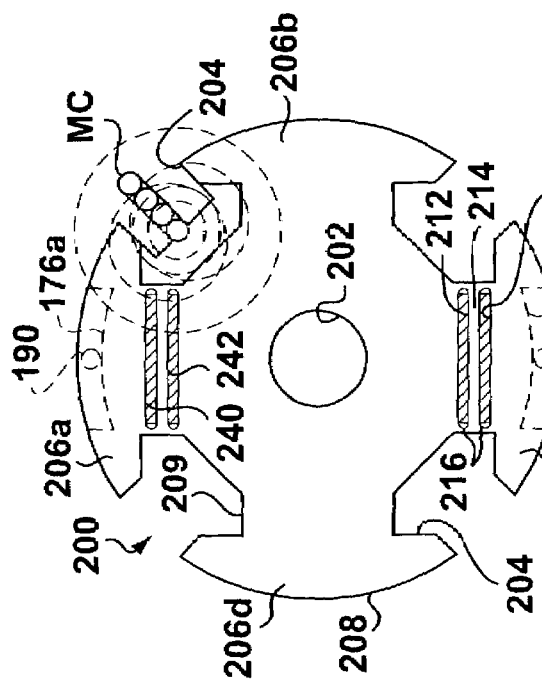

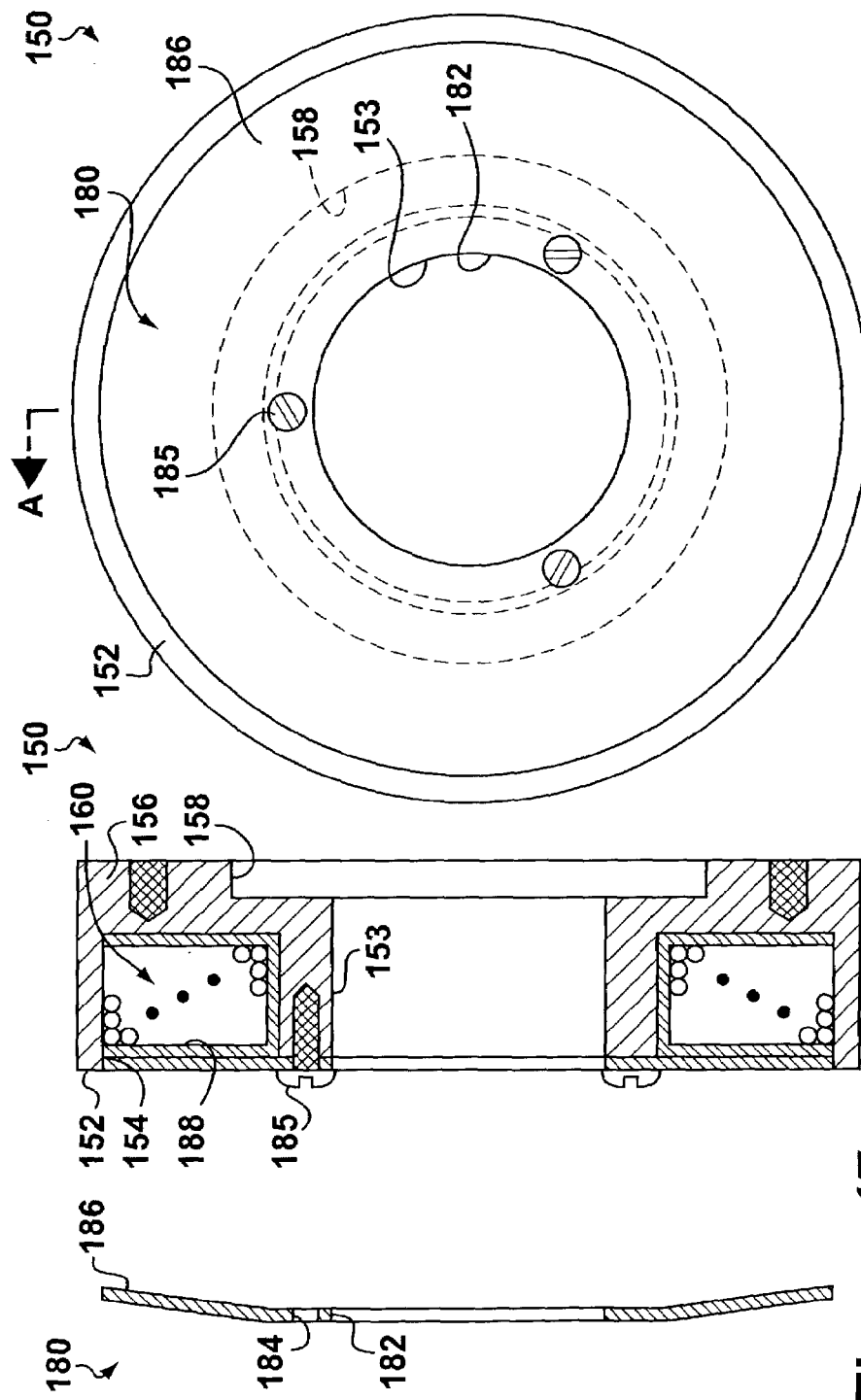

US 7,057,323 B2

MODULAR FLUX CONTROLLABLE PERMANENT MAGNET DYNAMOELECTRIC MACHINE

FIELD OF THE INVENTION

The present invention relates generally to dynamoelectric machines, such as electric motors, alternators, generators, and the like. More particularly, the present invention relates to a modular assembly for a permanent magnet dynamoelectric machine having a rotor assembly with interior permanent magnets and a flux controlling assembly.

BACKGROUND OF THE INVENTION

One limitation of electromagnetic machines utilizing permanent magnets is that the permanent magnets provide a constant level of magnetic flux that does not necessarily correspond to the most desirable flux levels for the anticipated operating conditions of the machine. This limitation is of particular significance in applications where the electromagnetic machine is likely to operate in significantly different operating modes. For example, the constant magnet flux limitation is of particular significance in laundry applications where the motors used in such applications are anticipated to operate in a high speed/low torque operating mode (e.g., during the spin cycle of the laundry machine) and in a low speed/high torque operating mode.

In the past and in an effort to minimize the negative consequences of the constant flux limitations described above, a number of compromises have been made. For example, in applications like laundry applications where a motor is anticipated to operate in a high speed/low torque mode, the motor is often designed to have a minimal number of winding turns in each phase winding. While the use of such a minimal number of turns tends to ensure desirable operating in the high speed/low torque mode, it creates problems if the motor is to be operated in a high torque/low speed mode because effective operation of the motor in such a mode requires that relatively high currents be established in the motor windings. To provide such currents, the power devices driving the motor, such as the inverter, must be sufficiently large to handle such large currents, resulting in increased inverter cost and complexity.

U.S. Pat. No. 5,530,307, which is incorporated herein by reference in its entirety, discloses a solution for dynamically adjusting the flux in a brushless permanent magnet dynamoelectric machine such that the motor can effectively operate in different operating modes and such that the cost and complexity of the inverter driving the machine can be optimized. The disclosed solution allows the phase switching of the machine to be accomplished with an inverter of conventional design.

In FIG. 1 of the present disclosure, a component 10 of a brushless, permanent magnet dynamoelectric machine as disclosed in the '307 Patent is illustrated. The component 10 includes a rotor assembly 20 and a flux controlling assembly 40. The rotor assembly 20 is positioned within a stator assembly (not shown) of the machine and includes a rotor shaft 22 having a plurality of stacked rotor laminations 24 mounted thereon. The rotor laminations 24 form a plurality of outwardly salient poles 26a, 26b. Permanent magnets 30a, 30b magnetically attach to the rotor laminations 24. The magnets 30a, 30b are elongated and bread loaf-shaped. First arcuate surfaces 32 of the magnets are magnetically attached to the laminations 24. The magnetic attachment produces a consequent rotor assembly in which each of the poles 26a, 26b formed by the rotor laminations 24 is now the same type pole. For example, all the poles 26a, 26b formed by the rotor laminations 24 may be south poles, and the north poles for the rotor assembly 20 are formed by the respective magnets 30a, 30b.

The flux controlling assembly 40 is used to control the available flux coupled between the rotor assembly 20 and the stator assembly of the machine. The flux controlling assembly 40 includes a magnetic mounting fixture 42, a coil 44, a cage 50, and legs 52a, 52b. The magnetic mounting fixture 42 attaches to an end wall (not shown) of the machine by an attachment member 48, and the coil 44 is installed on the magnetic mounting fixture 42. Thus, the coil 44 is fitted about the rotor shaft 22 such that an air gap (not visible) is formed therebetween. The cage 50 is tubular and is disposed about the magnetic mounting fixture 42 and coil 44. Another air gap G3 is formed between the mounting fixture 42 and an inside diameter of the tubular cage 50.

The legs 52a, 52b on the cage 50 extend the length of the lamination stack of the rotor assembly 20. The legs 52a, 52b have arcuate outer surfaces 54 that face the stator assembly and have arcuate inner surfaces that magnetically attach to a second surface 34 of the permanent magnets 30a, 30b. With the legs 52a, 52b attached to the permanent magnets 30a, 30b and the magnets attached to the rotor assembly 20, the cage 50 is suspended about fixture 42 and can rotate in synchronism with the rotor shaft 22. The flux controlling assembly 40 can provide a diverted flux path that is different from the primary flux path between the rotor assembly 20 and the stator assembly. The diverted flux can either additively or operatively combine with the primary flux depending upon the direction of current flow supplied to the coil 44. In this way, the flux of the disclosed machine can be controlled by controlling current flow to the coil 44. With the flux controlling assembly 40, for example, it is possible to reduce machine torque, particularly at high speed, and to reduce current requirements for the machine.

Although the machine of the '307 Patent operates well and has several advantages over conventional designs, there is room for improvement. For example, the solid, elongated construction of the legs 52a, 52b of the cage 50 leads to iron losses and may produce undesirable cogging torques.

The present invention is directed to overcoming, or at least reducing the effects of, one or more of the problems set forth above.

SUMMARY OF THE PRESENT DISCLOSURE

A modular assembly for an electromagnetic machine is disclosed. The modular assembly includes a rotor assembly and a flux controlling assembly. The rotor assembly has a shaft and has a plurality of rotor laminations mounted on the shaft. The rotor laminations define at least four salient rotor poles. At least one permanent magnet is embedded in the rotor laminations of each of at least two salient rotor poles. Alternatively, at least two permanent magnets are buried in layers in each of each of at least two salient rotor poles. The rotor assembly can have a consequent or non-consequent pole arrangement, and the permanent magnets can be installed in magnet retentions slots defined in the plurality of rotor laminations. The flux controlling assembly has a stationary coil disposing about the shaft for controlling flux of the disclosed machine. The flux controlling assembly also has a cage supported on the rotor assembly for transferring flux between the coil and the at least two salient rotor poles with embedded magnets. In one embodiment, a support member is mounted on the shaft and supports the cage thereon. The support member can be composed of a magnetic or non-magnetic material. Furthermore, the support member can include a plurality of support laminations. The support laminations can define magnet retention slots for supporting ends of the magnets. In another embodiment, a support member or connector is connected between the cage and the at least two rotor poles with embedded magnets to support the cage on the rotor assembly. The connector can be a separate component attached to bores in the at least two salient rotor poles and the cage or can be an integral component of the cage. In yet another embodiment, ends of the permanent magnets can be supported on support laminations mounted on the shaft of the rotor, and the cage can be supported on the ends of the permanent magnets.

The foregoing summary is not intended to summarize each potential embodiment or every aspect of the subject matter disclosed herein.

BRIEF DESCRIPTION OF THE DRAWINGS

The foregoing summary, a preferred embodiment, and other aspects of the subject matter of the present disclosure will be best understood with reference to a detailed description of specific embodiments, which follows, when read in conjunction with the accompanying drawings, in which:

FIGS. 9A–B illustrates views of an embodiment of a rotor lamination for the disclosed machine of FIG. 8 having consequent rotor poles and multiple buried magnets;

FIG. 10A illustrates a plan view of an embodiment of a support lamination for the laminated support member of FIG. 8;

FIG. 10B illustrates a plan view of another embodiment of a support lamination for the laminated support member of FIG. 8;

FIGS. 16A–B illustrate a side cross-sectional and a frontal view of an embodiment of a coil, mounting fixture, bobbin 188, and cover ring for use with the disclosed machine.

FIG. 17 illustrates a side cross-section of a preferred cover ring for use with the disclosed machine.

Figure 1:
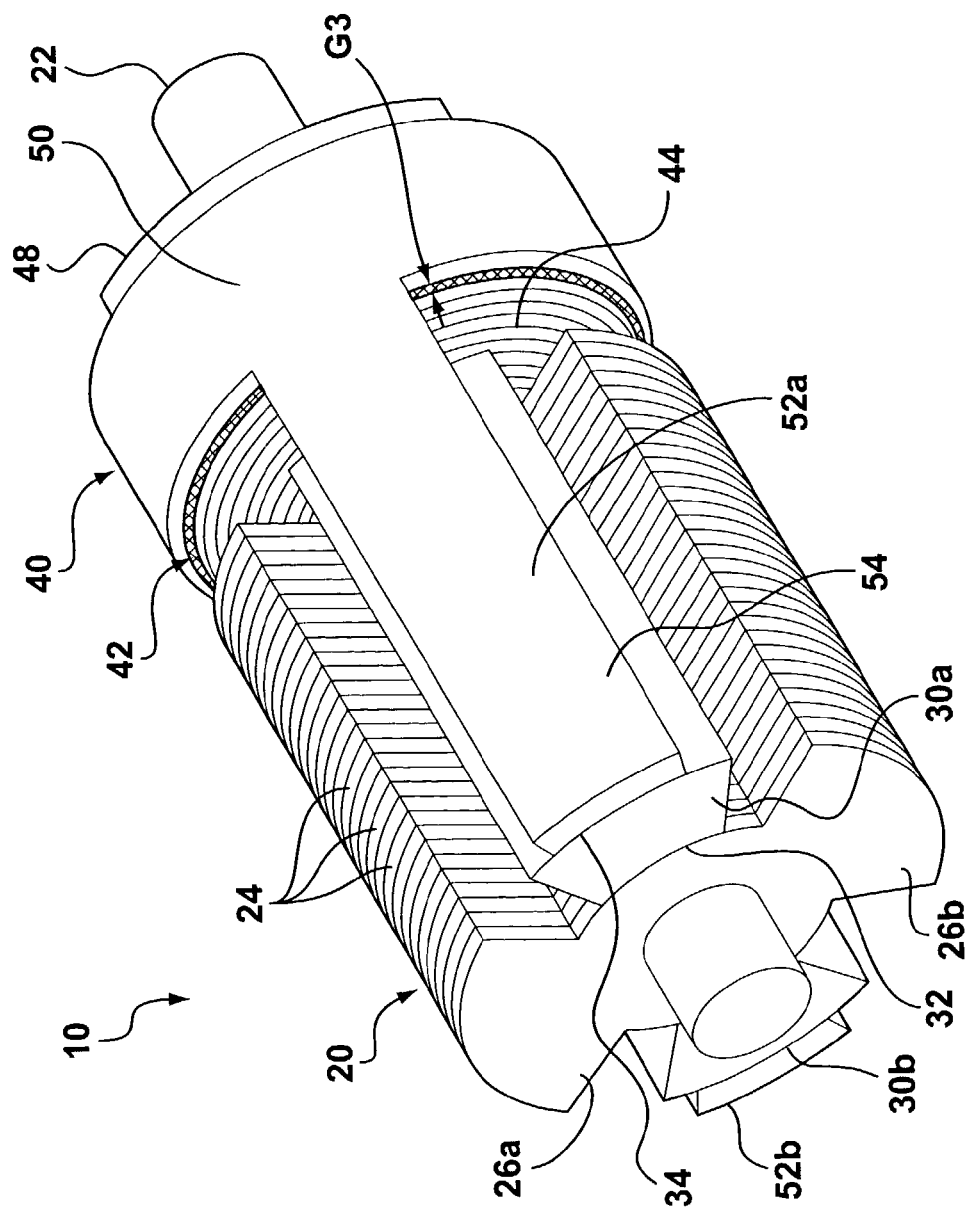
FIG. 1 illustrates a perspective view of a rotor assembly of a flux controllable dynamoelectric machine according to the prior art.

While the disclosed dynamoelectric machine is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person of ordinary skill in the art by reference to particular embodiments, as required by 35 U.S.C § 112.

DETAILED DESCRIPTION

Figure 2:
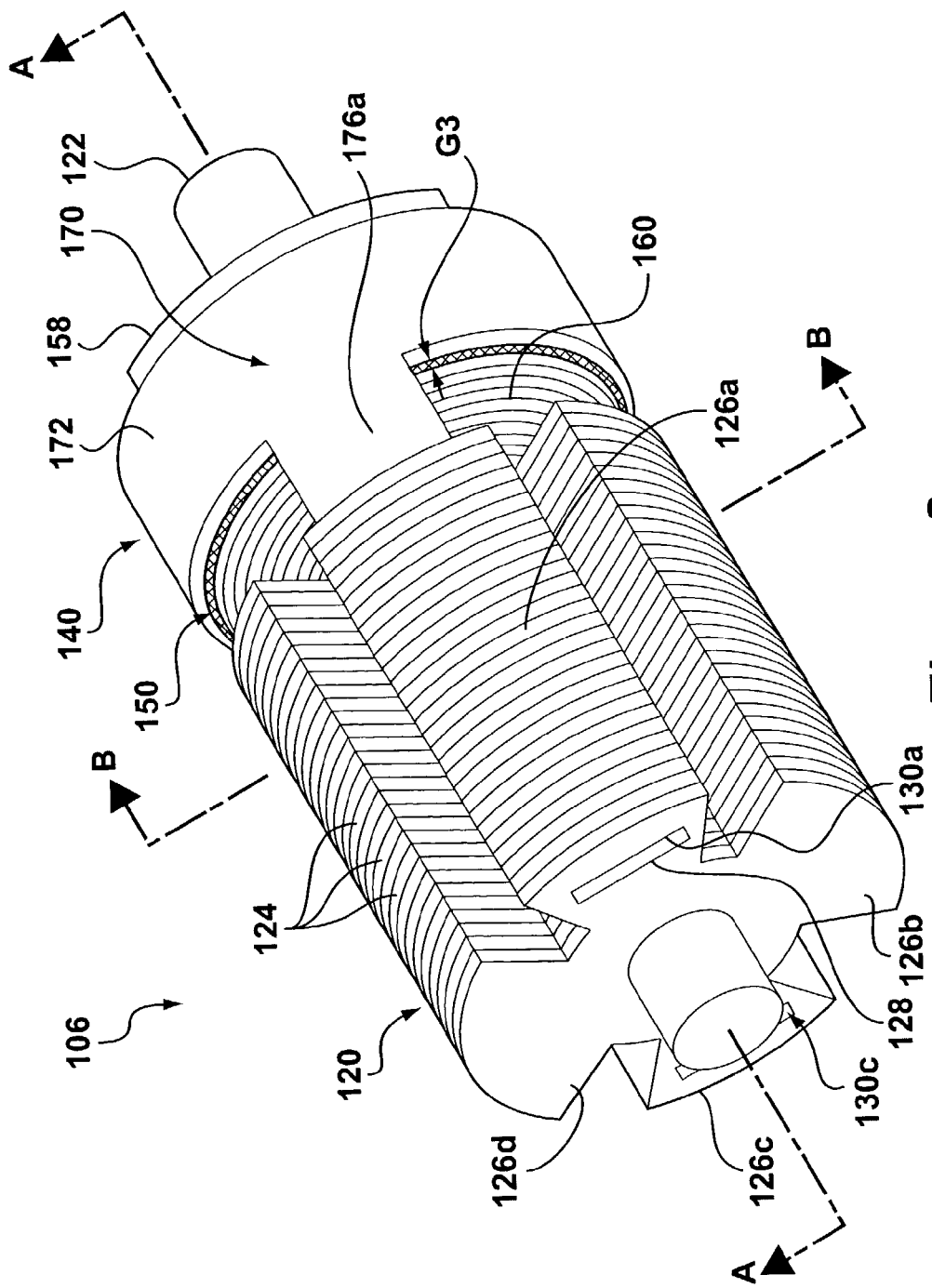
FIG. 2 illustrates a perspective view of a first embodiment of a modular assembly for a dynamoelectric machine according to certain teachings of the present disclosure.
Figure 3A:
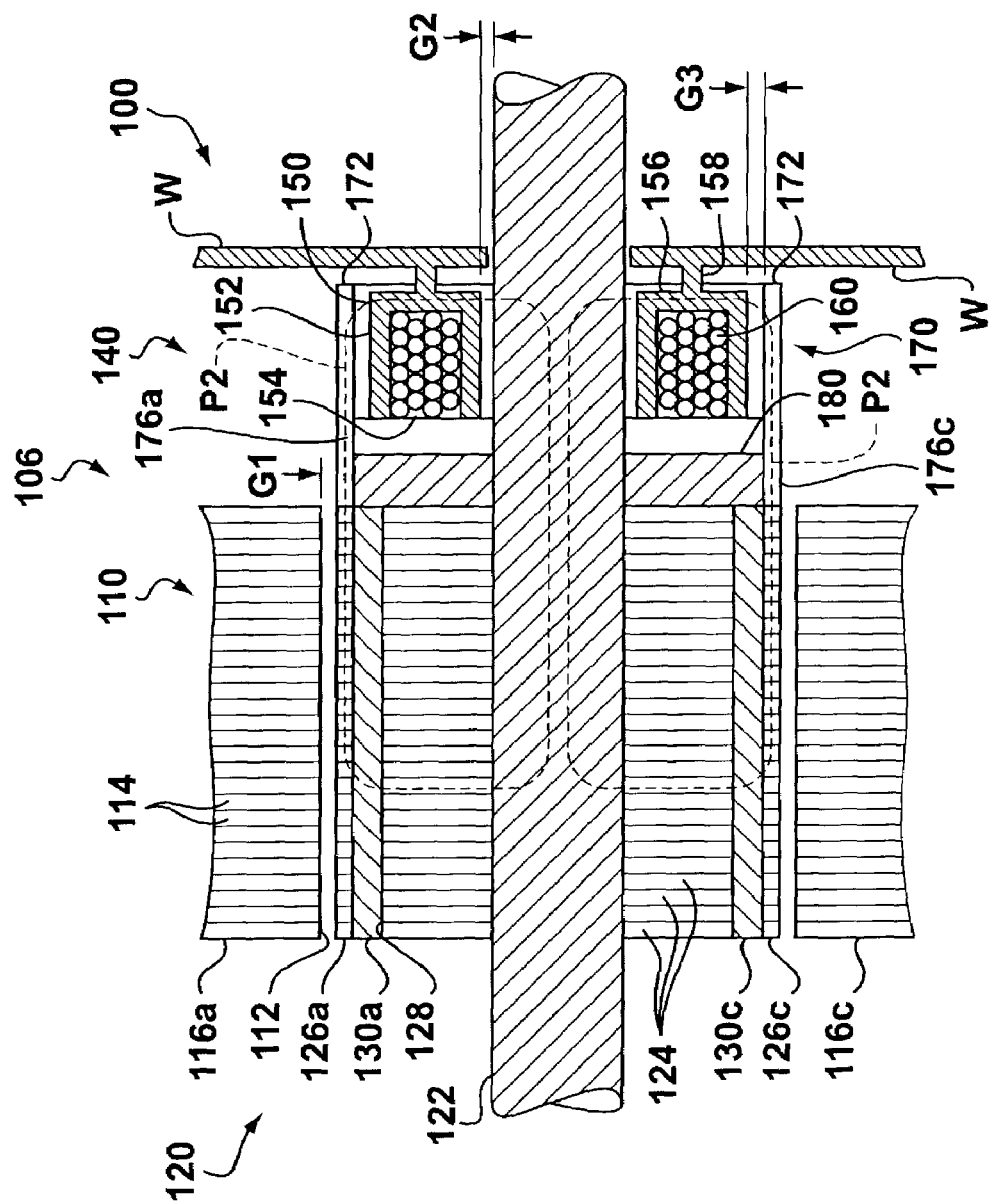
FIG. 3A illustrates a cross-sectional view of the disclosed machine showing a stator assembly, the modular assembly of FIG. 2, and diverted flux paths through the machine.
Figure 3B:
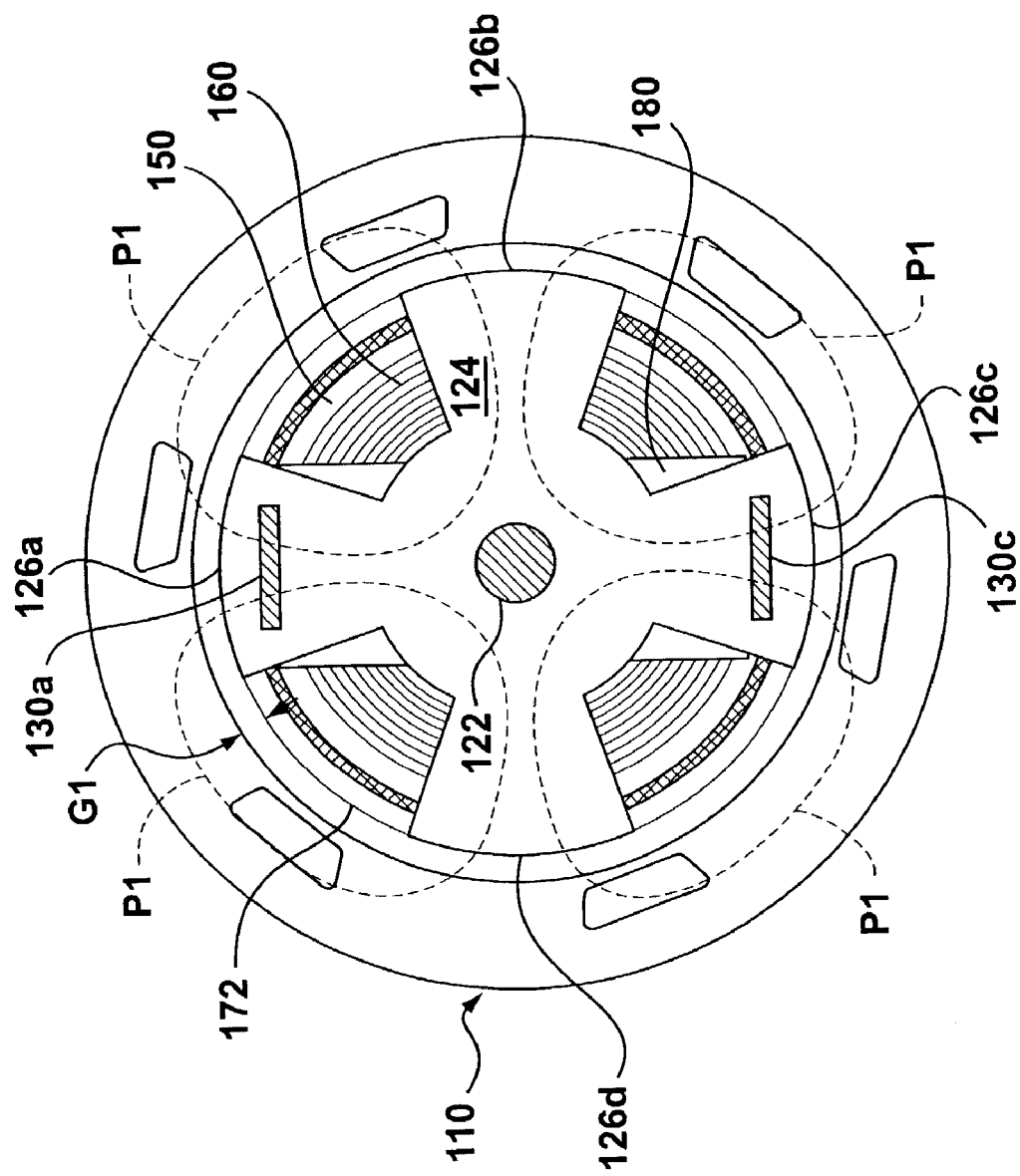
FIG. 3B illustrates an end-sectional view of the disclosed machine of FIG. 3A showing primary flux paths through the machine.
Figure 4:
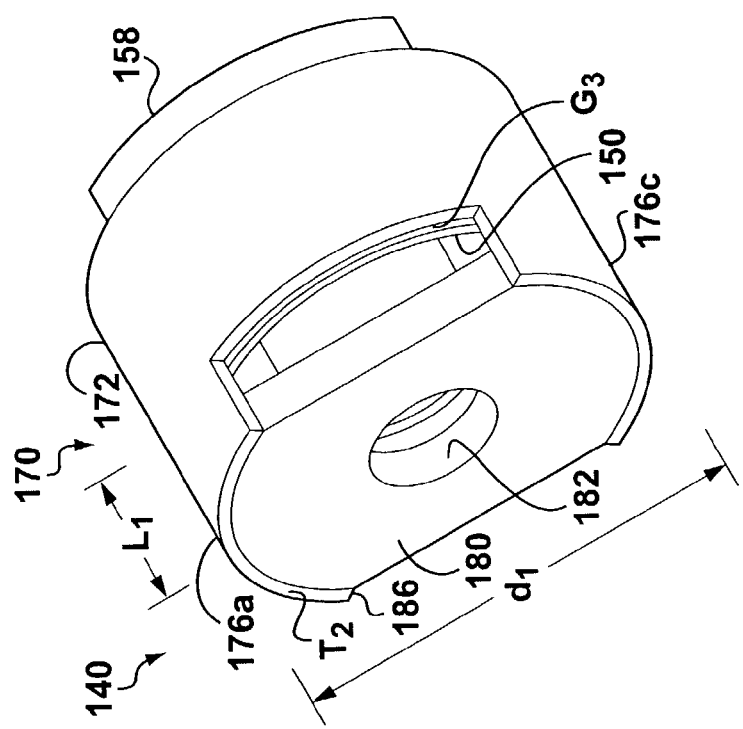
FIG. 4 illustrates a perspective view of an embodiment of a cage, a coil mounting fixture, and a support member for the disclosed machine of FIGS. 3A–B.

Referring to FIGS. 2–4, components of an embodiment of a dynamoelectric machine 100 according to certain teachings of the present disclosure are illustrated. In FIG. 2, a modular assembly 106 for the disclosed machine 100 is illustrated in a perspective view. In FIGS. 3A–B, the modular assembly 106 is shown in cross-sectional views along lines A—A and B—B and is shown positioned within a stator assembly 110 of the disclosed machine 100. In FIG. 4, embodiments of a cage 170 and a support member 180 are illustrated in a perspective view. For clarity, additional components of the disclosed machine 100, such as bearings, housings, and windings, are not shown in FIGS. 2–4.

As best shown in FIG. 2, the modular assembly 106 includes a rotor assembly 120 and a flux controlling assembly 140. The rotor assembly 120 includes a rotor shaft 122, a plurality of outwardly salient rotor poles 126a–d, and a plurality of permanent magnets 130a, 130c. The rotor assembly 120 is of the interior permanent magnet (IPM) type and can be used in a brushless, permanent magnet motor, for example. Although the rotor assembly 120 is shown in the drawings as a four-pole rotor, it will be understood that other rotor assemblies of the disclosed machine can generally have a plurality of rotor poles and preferably have an even number of rotor poles greater than or equal to four. The rotor assembly 120 is preferably formed from a stack of rotor laminations 124 that are coupled together using known techniques (e.g., by interlocking features, glue, connectors, etc.) and that are mounted on the shaft for rotation therewith by known techniques. The plurality of stacked rotor laminations 124 defines the plurality of outwardly salient rotor poles 126a–d.

The permanent magnets 130a, 130c are embedded within the salient rotor poles 126a, 126c. The permanent magnets 130a, 130c are arranged with their outer poles being diametrically opposed to each other and are flanked in the radial directions by the salient poles 126b, 126d formed by the highly permeable laminations 124. Because the polarity of the permanent magnets 130a, 130c are opposed to each other and repel each other, the rotor poles 126a, 126c in which they are embedded are polarized according to one polarity orientation, such as N-pole, while the flanking salient rotor poles 126b, 126d are polarized to the opposite orientation, such as S-pole. With such an arrangement, the mutual repulsion of the diametrically opposed magnetic poles provides the rotor with magnetic poles twice the number of permanent magnets.

As best shown in the cross-sectional view of FIG. 3A, each rotor lamination 124 has a magnet retention slot 128 defined in the salient rotor poles 126a, 126c. In the stack of rotor laminations 124, the slots 128 are substantially aligned so that they extend axially along the length of the salient rotor poles 126a and 126c from one end of the rotor assembly 120 to the other. The permanent magnets 130a, 130c are installed in these slots 128, and the outer surfaces of the rotor laminations 124 radially hold the magnets 130a, 130c so that they will not be dislodged due to high speed rotations. Accordingly, the need for an outside member or leg for covering and holding the outer periphery of the magnets 130a, 130c, such as the legs used in the prior art machine discussed in the background section, is eliminated altogether. Furthermore, any iron losses due to such a solid member, such as the prior art legs, can be avoided.

In the present embodiment of the disclosed machine, the permanent magnets 130a, 130c are preferably block magnets having a substantially rectilinear cross-section. The use of block magnets 130a, 130c in the disclosed machine has a simple configuration and are easy to manufacture. For example, the block magnets 130a, 130c do not require high precision for finishing their surfaces.

The permanent magnets 130a, 130c used in the disclosed machine can include any of the various types and materials known in the art. For example, the permanent magnets 130a, 130c can be cast, sintered, or resin bound types and can be, but are not limited to, ferrite magnets, alnico magnets, praseodymium alloy magnets, rare earth-neodymium magnets, rare earth-samarium cobalt magnets, or neodymium-iron-boron compounds. Using high-performance magnets, such as rare earth magnets, enables the permanent magnets 130a, 130c of the disclosed machine to be relatively thin, which is advantageous in terms of performance and manufacturing for the embedded magnet-type rotor assembly 120 of the disclosed machine.

The permanent magnets 130a, 130c can be fixed within the magnet retention slots 128 using glue or other techniques. Alternately, the permanent magnets 130a, 130c can be sized to be retained within the magnet retention slots 128 through a friction-fit arrangement. In one embodiment of the disclosed machine 100, for example, a special configuration of the magnet retention slots 128 can be used to help maintain the positioning of the magnets 130a, 130c within the magnet retention slots 128 and to inhibit unwanted movement of the magnets 130a, 130c within the slots 128 at high speeds and/or high current (often times called magnet "chattering") despite minor variations in the size of the magnets 130a, 130c and the precise dimensions of the magnet retention slots 128. Teachings of suitable configurations for the magnet retention slots 128 are disclosed in U.S. patent application Ser. No. 10/229,826, filed Aug. 28, 2002 and entitled "Interior Permanent Magnet Motor for Use in Washing Machines," which is incorporated herein by reference. Use of such a special configuration can provide for quieter operation of the disclosed machine 100 and can allow for an increase in the tolerances of the dimensions of the magnets 130a, 130c and the magnet retention slots 128 to potentially reduce the costs associated with constructing the disclosed machine 100.

As shown in cross-sectional view of FIG. 3A, the stator assembly 110 for the disclosed machine can be formed from a stack of substantially identical stator laminations 114 having a plurality of inwardly salient poles, only two of which 116a, 116c are shown in FIG. 3A. The stator poles 116 define a central bore 112 in which the rotor assembly 120 is positioned. As best shown in the end section of FIG. 3B, the stator assembly 110 can be non-segmented such that each stator lamination 114 defines each of the stator poles 116. Six stator poles 116 are shown in the present example for the four-pole rotor assembly 120. In general, however, the stator assembly 110 of the disclosed machine 100 can include a plurality of stator poles and can have distributed or concentrated winding (not shown). In one embodiment, for example, the disclosed machine 100 can include a four-pole rotor and a twelve-pole stator having concentrated winding.

Because the assembly 106 is modular, the rotor assembly 120 can be installed and can sufficiently function within the disclosed machine 100 without the flux controlling assembly 140 installed in the machine. Thus, benefits of the rotor assembly 120 described in more detail herein can be realized without a flux controlling assembly 140. To control the flux, however, the flux controlling assembly 140 can also be installed in the disclosed machine 100. With a number of exceptions, the flux controlling assembly 140 of the disclosed machine is substantially similar to that disclosed in U.S. Pat. No. 5,530,307, which has been incorporated by reference in its entirety. As best shown in FIG. 2, the flux controlling assembly 140 includes a coil mounting fixture 150, a coil 160, and a cage 170. The mounting fixture 150, which is composed of magnetic material, forms an annular housing 152. The coil 160, which is usually formed from wound copper wire, is installed in the annular housing 152 of the fixture 150. The mounting fixture 150 when installed in the disclosed machine 100 is mounted adjacent one end of the stacked rotor laminations 124. As best shown in the cross-section of FIG. 3A, the annular housing 152 of the fixture 150 has an open end 154 facing the rotor assembly 120. A closed end 156 of the fixture 150 attaches at 158 to a wall or face W of the motor housing or structure of the disclosed machine 100 so that the fixture 150 is stationary with respect to the rotation of the rotor assembly 120. The mounting fixture 150 has an inner diameter that is greater than a diameter of the rotor shaft 122 so that an air gap G2 shown in FIG. 3A is formed between the fixture 150 and the shaft 122.

The cage 170 is supported on the rotor assembly 120. As best shown in FIG. 2, the cage 170 includes a tubular body portion 172 for suspending about the fixture 150. The cage 170 also includes a plurality of edge portions (only 176a is shown in FIG. 2) for contacting a respective one of the salient rotor poles 126a, 126c having the embedded magnets 130a, 130c. When the cage 170 is mounted in the disclosed machine 100, the tubular body portion 172 is suspended about the stationary mounting fixture 150 and coil 160 such that an air gap G3 is formed between the mounting fixture 150 and an inside surface of the tubular body portion 172.

As best shown in FIG. 3A, the edge portions 176a, 176c of the cage 170 are extensions of the circumferential edge of the tubular body portion 172 that respectively extend a relatively short distance from the tubular body portion 172. Distal ends of the edge portions 176a, 176c are in substantial contact with the rotor poles 126a, 126c having the embedded magnets 130a, 130c. As described in more detail below, the edge portions 176a, 176c and tubular body portion 172 enable diverted flux to be transferred between the rotor poles 126a, 126c with embedded magnets 130a, 130c and the coil 160. In the present embodiment, a support member 180 is mounted on the rotor shaft 122 adjacent an end of the rotor laminations 124. The support member 180 supports the cage 170 on the shaft 122 and keeps the body portion 172 suspended about the stationary fixture 150 and coil 160. Furthermore, the support member 180 keeps the edge portions 176a, 176c in substantial contact with the rotor poles 126a, 126c with embedded magnets 130a, 130c.

In FIG. 4, the cage 170, mounting fixture 150, and support member 180 for the disclosed machine of FIGS. 2–3B are illustrated in a perspective view. The support member 180 is a substantially radial member and defines a central bore 182 for mounting on the rotor shaft 122 using techniques known in the art. The support member 180 has end surfaces 186 that support at least one surface of the cage 170. In the present embodiment, the end surfaces 186 are arcuate for contacting and supporting the inner surface of the cage 170 substantially at the edge portions 176a, 176c.

For the four-pole rotor assembly having two poles with embedded magnets of the present embodiment, the support member 180 can resemble a two-pole arrangement as shown. For a six-pole rotor assembly having magnets embedded in three alternating poles, the cage can have three edge portions and the support member can resemble a three-pole arrangement, for example. Alternatively, the support member 180 can have a complete disc shape with one radial surface for contacting and supporting the inner surface of the edge portions 176a, 176c of the cage 170. Preferably, the thickness $T_1$ of the support member 180 is minimized so to conserve space between the adjacent rotor assembly (not shown), stationary fixture 150, and coil (not shown). In addition, the length $L_1$ that the edge portions 176a, 176c of the cage 170 extend is preferably and substantially equivalent to the thickness $T_1$ of the support member 180 to conserve space.

The end surfaces 186 of the support member 180 can be attached or connected to the edge portions 176a, 176c using mechanisms or techniques known in the art. For example, a glue or adhesive can be used to attach the support ends 186 and edge portions 176a, 176c together. The support member 180 can be composed of a number of materials and can be a unitary piece of material or can be formed by a plurality of laminations. In the present embodiment, for example, the support member 180 can be composed of a single piece of non-magnetic material, such as aluminum or plastic. As described below, for example, other embodiments of support members can be formed from a plurality of laminations composed of magnetic material and mounted on the shaft.

The cage 170 can be formed of a highly permeable powdered metal pressed or otherwise formed to provide a sturdy and stable member that can withstand the centrifugal forces produced when the disclosed machine 100 is operating at speed. The thickness $T_2$ of the edge portions 176a, 176c and the tubular body portion 172 is preferably selected to optimize a number of variables, including saturation levels of components of the assemblies 120 and 140, flux density of the magnets 130, and structural integrity of the cage 170, among other considerations. In one example, the length $L_1$ of the edge portions 176 and the thickness $T_1$ of support member 180 may be chosen so that the amount of space available for the mounting fixture 150 and coil 160 can be maximized, yet still obtain proper structural integrity, sufficient flux diversion, and optimal saturation levels of the cage 170. The cage 170 and edge portions 176a, 176c can have a thickness $T_2$ of approximately 0.120-inch. The length $L_1$ of the edge portions 176a, 176c can be substantially equivalent to the thickness $T_1$ of the support member 180. The length $L_1$ and the thickness $T_1$ can be approximately in the range of approximately 0.100 to 0.350-inch, for example. It is understood that values provided herein are only exemplary and that selection of particular values depends on criteria specific to an implementation of the disclosed machine 100.

To control the flux of the disclosed machine 100 using the flux controlling assembly 140, a DC current can be supplied to the coil 160 during operation. Two, isolated flux paths P1 and P2 are indicated by the dashed lines in FIGS. 3A and 3B. A primary flux path P1 is shown in FIG. 3B extending through the salient rotor poles 126a and 126c, through the permanent magnets 130a, 130c, across the air gap G1, through the stator 110, and back.

In contrast, a diverted flux path P2 is shown in FIG. 3A. Flux from the coil 160 bridges the air gap G2 between fixture 150 and the rotor shaft 122. The flux is transmitted through the rotor shaft 122 to the staked rotor laminations 124. The flux flows through the rotor laminations 124 and the permanent magnets 130 and then flows between the rotor laminations 124 to the edge portions 176a, 176c of the cage 170. Even though the rotor poles 126a, 126c are laminated, flux can flow between the laminations 124 by virtue of the numerous metal to metal contact points between them. Minute air gaps between the rotor laminations 124 may tend to reduce the diverted flux flow between laminations 124 but not to a significant degree to hinder operation of the disclosed flux controlling assembly 140.

As noted above, the edge portions 176a, 176c of the cage 170 are in substantial contact with the end of the stacked laminations 124 of the rotor assembly 120. The contact therebetween allows the diverted flux to transfer from the salient rotor poles 126a, 126b to the cage 170. Therefore, distal ends of the edge portions 176a, 176c and the end of the stacked rotor laminations 124 of the rotor assembly 120 preferably have a maximum amount of metal to metal contact where they touch or abut one another. In addition, the distal ends of the edge portions 176a, 176c are preferably flush and substantially perpendicular to a central axis of the cage 170, and the rotor laminations 124 are preferably mounted substantially perpendicular to the shaft 122.

With the edge portions 176a, 176c contacting the rotor poles 126a, 126c, magnetic flux travels from the rotor poles 126a, 126c to the edge portions 176a, 176c and into the tubular body portion 172. The flux then bridges the air gap G3 and flows through fixture 150 back to the coil 160. The diverted flux path P2 either can additively or operatively combine with the flux through primary path P1 depending upon the direction of current flow through the coil 160. In this way, the resultant flux of the disclosed machine 100 can be controlled by controlling current flow to the stationary coil 160. The flux controlling assembly 140 can reduce the torque, particularly at high speed, and can reduce the current requirements for electronic components (not shown) of the disclosed machine 100, such as an inverter.

As evidenced herein, the disclosed machine 100 has a number of benefits over the prior art machine of FIG. 1. In one aspect, the rotor assembly 120 can be used independently from the flux controlling assembly 140 in the disclosed machine 100. In another aspect, iron losses of the disclosed machine 100 having the rotor and flux controlling assemblies 120 and 140 can be reduced in comparison to the losses of the prior art machine of FIG. 1. In particular, the prior art machine of FIG. 1 has long, solid legs of material, which can cause greater iron losses than desirable. In contrast, the disclosed machine 100 has salient rotor poles 126 that are fully laminated, reducing iron losses.

In a further aspect, the flux controlling assembly 140 can be used with a skewed stack of rotor laminations 124 on the rotor assembly 120 where each lamination 124 is mounted at a successively different orientation on the shaft 122. With successively skewed laminations 124, the magnet retentions slots 128 in each lamination form a substantially helical slot for the permanent magnets 130. Accordingly, the permanent magnets 130 can be directly formed within the helical slots in the rotor 120 using techniques known in the art. For example, the permanent magnets 130 can be formed from magnetic powder and epoxy binder compressed in the helical slots. The long, solid legs on the cage of the machine of the '307 Patent as illustrated in FIG. 1 and the large, bread loaf magnets can make manufacturing the prior art machine impractical with such a skewed rotor.

In yet another aspect, the disclosed machine 100 has improved performance and operation over the prior art machine. In the prior art machine of FIG. 1, the long, solid legs of the cage include outer surfaces that define substantially uniform arcs because manufacturing difficulties and expense can prohibit shaping these surfaces any other way. Thus, the air gaps formed between the legs and the stator poles in the prior art machine are substantially concentric or uniform. In contrast, the salient rotor poles 126a, 126c with embedded permanent magnets 130a, 130c of the disclosed machine 100 are formed from stacked laminations 124. Thus, the faces of these rotor poles 126a, 126c and the other rotor poles 126b, 126d can be readily contoured or flared to improve the performance and operation of the disclosed machine 100 with or without the flux controlling assembly 140 installed. For example, the faces of all the poles 126a–d may be contoured to shape the back electromotive force (EMF) of the disclosed machine 100 to a more sinusoidal shape. In addition, the faces of all the rotor poles 126a–d may be contoured to reduce the cogging torque of the disclosed machine 100. These and other benefits of the disclosed rotor assembly 120 can be realized with or without the flux controlling assembly 140 installed in the machine 100.

The disclosed machine 100 can be used in a number of applications. For example, the disclosed machine 100 may be particularly usable either as an appliance motor, as a traction motor drive, or as an alternator/generator in automotive application. As an alternator/generator, for example, a flux controllable dynamoelectric machine according to teachings of the present disclosure can have certain advantages over typical alternator/generators presently used in automobiles. With the increased enhancements made in automobiles with respect to performance and passenger comfort, a need exists for an alternator/generator capable of supplying more electricity. A particular problem in this area is that the output for the alternator/generator must be constant over a wide range of operating speeds. A flux controllable machine according to certain teachings of the present disclosure, used with appropriate microprocessor or similar controls could fulfill the current requirements regardless of how fast the alternator/generator is running.

When the disclosed machine 100 is used as an alternator/generator, no current is supplied to the stationary coil 160 of the flux controlling assembly 140 for most of the time during operation. The flux controlling assembly 140 is used primarily for intermittent conditions. For example, when starting the automobile, a maximum current can be supplied to the coil 160 of the flux controlling assembly 140 to produce a maximum starting torque in the disclosed machine 100. During an alternator mode of the disclosed machine 100 under normal operation of the automobile between 3000 to 4000 r.p.m., for example, no current can be supplied to the coil 160, and the disclosed machine 100 with its beneficial characteristics of the rotor assembly 120 can operate with better efficiency than evidenced in the prior art. At high speeds of 6000 r.p.m., for example, a bucking current can be supplied to the coil 160 of the flux controlling assembly 140 to reduce over charging of the battery of the automobile.

Figure 6:
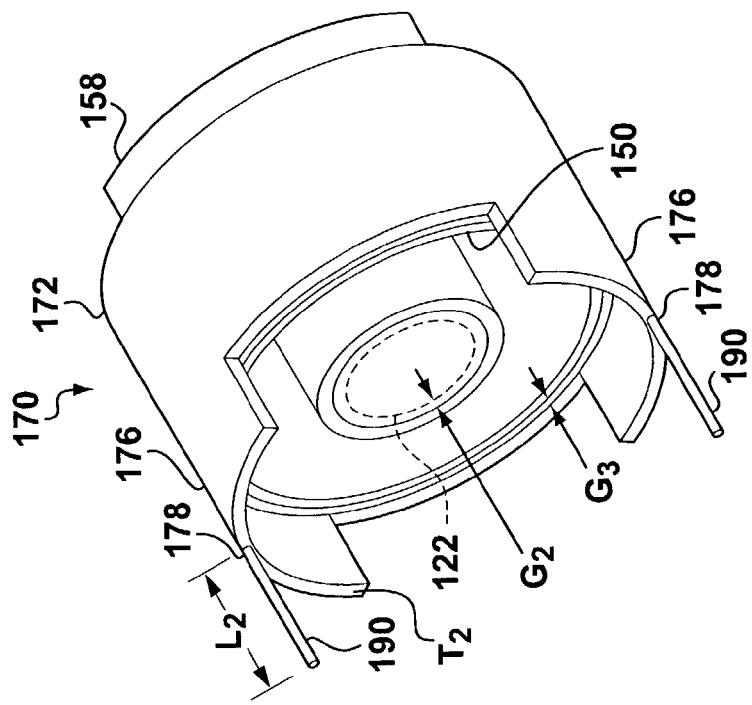
FIG. 6 illustrates a perspective view of an embodiment of a cage for the disclosed machine of FIG. 5.
Figure 5:
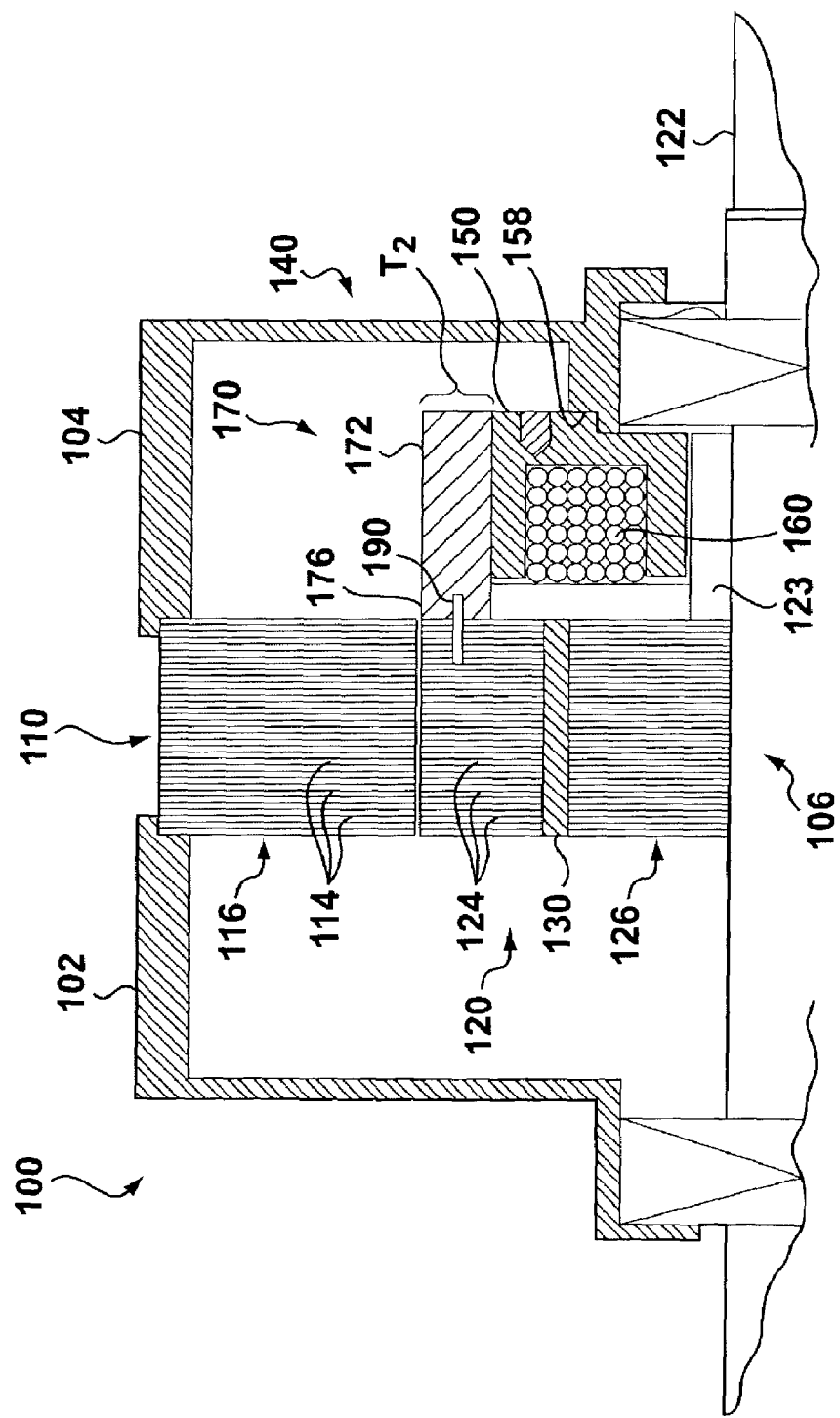
FIG. 5 illustrates a cross-sectional view of an embodiment of a modular assembly for a dynamoelectric machine according to certain teachings of the present disclosure having a support member or axial connector.

Referring to FIGS. 5–6, components of another embodiment of a flux controllable permanent magnet dynamoelectric machine 100 according to certain teachings of the present disclosure are illustrated. In the partial cross-sectional view of FIG. 5, the disclosed machine 100 is shown with a housing formed from first and second portions 102 and 104, although other housing configuration can be used. Many of the components of the present embodiment of the disclosed machine 100 are substantially similar to those in previous embodiments so that the same reference numerals are used. Furthermore, certain operationally characteristics of the present embodiment of the disclosed machine 100 are substantially similar to those described in previous embodiments.

In the partial cross-sectional view of FIG. 5, a stator assembly 110 is installed in the machine 100, and a modular assembly 106 having a rotor assembly 120 and a flux controlling assembly 140 is shown installed in the machine 100 as well. The rotor assembly 120 includes four salient rotor poles 126 (only one of which is shown in FIG. 5). A fixture 150 of the flux controlling assembly 140 has a coil 160 installed therein and is mounted at 158 to the housing 104 of the machine 100. Preferably, a sleeve 123 composed of metal is mounted on a shaft 122 of the rotor assembly 120. The sleeve 123 is positioned about the portion of the shaft 122 where the mounting coil 150 is located. Therefore, the other portion of the shaft 122 on the other side of the stack of rotor laminations 124 does not have such a sleeve. By decreasing the air gap between the shaft 122 and the mounting fixture 150 and by increasing the overall diameter of the shaft 122, the sleeve 123 increases the air gap permeance and reduces the flux density of the shaft 122.

A cage 170, which is shown in detail in FIG. 6, is mounted adjacent the rotor assembly 120. An edge portion 176 of the cage 170 extends from a tubular body portion 172 and makes substantial contact with a salient rotor pole 126 having a permanent magnet 130 embedded therein. One or more support members or axial connectors 190 are used between the edge portion 176 of the cage 176 and the salient rotor pole 126 with embedded magnet 130. The axial connector 190 can be a pin or other projecting member, for example. A number of rotor laminations 124 near an end of the stack of laminations 124 contain holes or bores formed therein. One end of the axial connector 190 is disposed in the partial bore formed in the salient rotor pole 126 with embedded magnet 130 and can be held therein by a friction fit, for example.

In the detail of FIG. 6, the other end of the axial connector 190 can be integrally formed on the edge portion 176 at 178 or can be disposed in a bore formed in the end of the edge portion 176 at 178. The axial connectors 190 preferably extend length $L_2$ of approximately 0.3 to 0.4-inch from the distal ends of the edge portions 176. Thus, the axial connectors 190*a* may position in bores formed in a number of rotor laminations when assembled on the rotor assembly.

In one aspect, the axial connector 190 of FIGS. 5 and 6 supports the cage 170 on the rotor assembly 120. Accordingly, the axial connector 190 can be composed of a non-magnetic material. In another aspect, the axial connector 190 can act as a conductor between the lamentations 124 of the salient rotor pole 126, with embedded magnet 130 and therefore can help divert the flow of flux from the rotor pole 126 to the cage 170 of the flux controlling assembly 140. Accordingly, the axial connector 190 can be composed of a magnetic material. In this respect, the axial connector 190 may short out some of the rotor laminations 124 through which it passes so that the benefit of having stacked rotor laminations 124 on a portion of the salient rotor pole 126 may be lost. Thus, the number of rotor laminations 124 through which the axial connector 190 passes is preferably kept to a minimum to reduce the number of rotor laminations 124 that may be shorted and yet still allow the connector 190 to provide structural support for the cage 170.

In general, the thickness $T_2$ of the edge portion 176 and body portion 172 of the cage 170 is preferably not greater than the distance from the magnet 130 to the end of the pole 126 adjacent the stator. Otherwise, the edge portion 176 and the cage 170 can interfere with windings or other components (not shown) of the stator. Because the axial connector 190 supports the cage 170 and can help to divert flux between the rotor pole 126 and flux controlling assembly 140, the thickness $T_2$ may be reduced compared to embodiments disclosed herein that have the edge portion 176 supported by another method or technique, such as a substantially radial member mounted to the shaft disclosed above with reference to FIGS. 2–3B.

Figure 7:
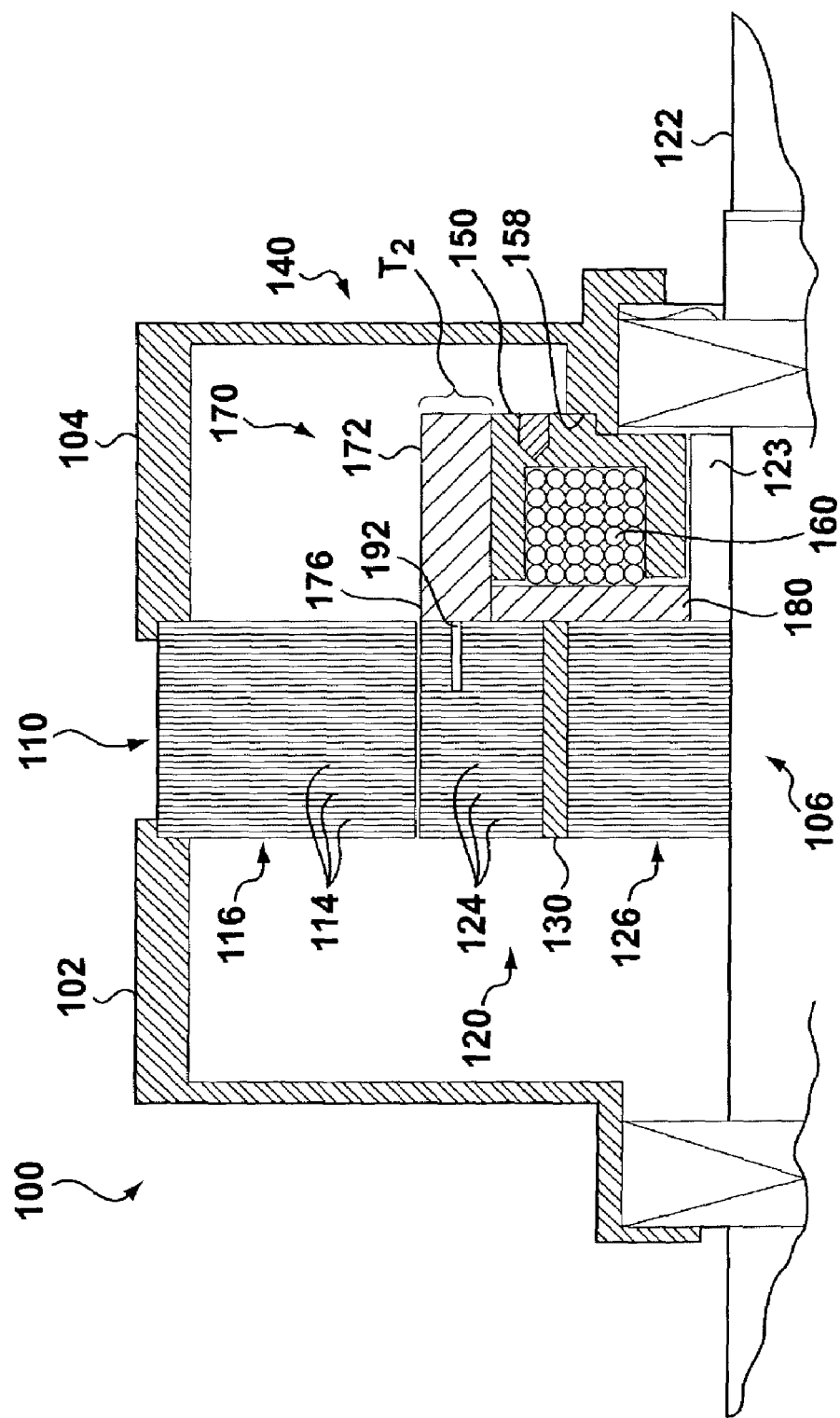
FIG. 7 illustrates a cross-sectional view of an embodiment of a modular assembly for a dynamoelectric machine according to certain teachings of the present disclosure having an axial flux member.

Referring to FIG. 7, components of another embodiment of a flux controllable permanent magnet dynamoelectric machine 100 according to certain teachings of the present disclosure are partially illustrated in a cross-sectional view. The present embodiment of the disclosed machine 100 has an axial flux member 192. Many of the components of the present embodiment of the disclosed machine 100 are substantially similar to those in previous embodiments so that the same reference numerals are used. Furthermore, certain operational characteristic of the disclosed machine 100 may be substantially similar to those of previous embodiments.

As before, a rotor assembly 120 includes four salient rotor poles 126 (only one of which is shown in FIG. 7). An edge portion 176 of a cage 170 extends from a tubular body portion 172 and makes substantial contact with the salient rotor pole 126 having a permanent magnet 130 embedded therein. One or more axial conductors 192 are positioned in the rotor pole 126. The axial conductor 192 can be a pin or other elongated member, for example. The axial conductor 192 is disposed through holes or bores formed in a number of rotor laminations 124 of the salient rotor pole 126. The axial conductor 192 acts as a conductor between the rotor lamentations 124 of the rotor pole 126 and therefore helps to divert flux flow from the pole 126 to the cage 170 and flux controlling assembly 140. To further facilitate the transfer of flux, an end of the axial conductor 192 can abut the edge portion 176 of the cage 170.

As noted above, the axial conductor 192 may short out some of the rotor laminations 124 through which it passes so that attention is necessarily paid to its dimensions to facilitate the diversion of flux without unduly hindering the primary flux paths of the disclosed machine 100. The cage 170 is supported by a support member 180 similar to those disclosed herein. Because the axial conductor 192 helps to divert flux between the rotor pole 126 and flux controlling assembly 140, the thickness $T_2$ of the edge portion 176 and body portion 172 of the cage 170 may be reduced compared to other embodiments.

Referring to FIGS. 8–10B, components of another embodiment of a flux controllable permanent magnet dynamoelectric machine 100 according to certain teachings of the present disclosure are illustrated. The present embodiment of the disclosed machine 100 has a plurality of rotor laminations 200, multiple buried permanent magnets 240, 242, and a plurality of support laminations 220. Many of the components of the present embodiment of the disclosed machine 100 are substantially similar to those in previous embodiments so that the same reference numerals are used. Furthermore, certain operational characteristic of the disclosed machine 100 may be substantially similar to those of previous embodiments.

Figure 8:
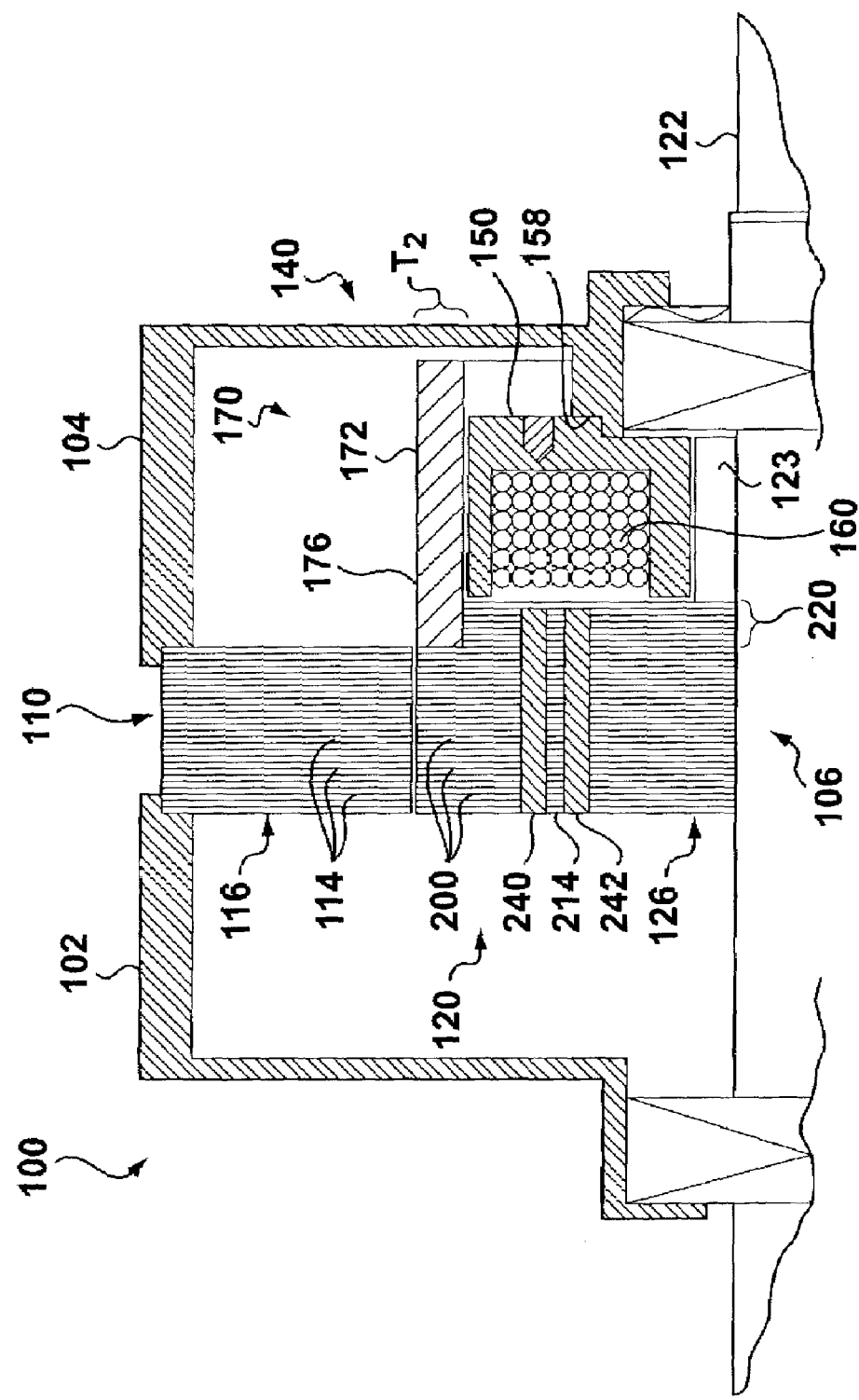
FIG. 8 illustrates a cross-sectional view of an embodiment of a modular assembly for a dynamoelectric machine according to certain teachings of the present disclosure having multiple buried magnets and a laminated support member.

In the partial cross-sectional view of FIG. 8, a rotor assembly 120 includes four salient rotor poles (only one rotor pole 126 is shown in FIG. 8). The salient rotor poles 126 are formed from a plurality of stacked rotor laminations 200 mounted on the shaft 122. An embodiment of a rotor lamination 200 for the disclosed machine 100 is discussed in detail with reference to FIGS. 9A–B. A plurality of permanent magnets are buried or embedded in layers in the salient rotor poles. In the present embodiment, two permanent magnets 240 and 242 are shown buried in a layer in the salient rotor pole 126. The permanent magnets 240 and 242 are separated by a separating portion or layer 214 of the rotor laminations 200 and are preferably rare earth-neodymium magnets or rare earth-samarium cobalt magnets.

An edge portion 176 of cage 170 extends from a body portion 172 of the cage 170 and makes substantial contact with the rotor laminations 200 for transferring diverted flux. In contrast to previous embodiments, the edge portion 176 is supported by a support member formed from a plurality of support laminations 220 mounted on the shaft 122. Ends of the permanent magnets 240 and 242 extend into magnet retention slots formed in these support laminations 220. Embodiments of a support lamination 220 for the disclosed machine 100 are discussed in detail with reference to FIGS. 10A–B.

In FIG. 9A, an embodiment of a rotor lamination 200 for the disclosed machine of FIG. 8 is illustrated in a plan view. The rotor lamination 200 includes a central opening 202 for mounting on the rotor shaft (not shown) using techniques known in the art. A plurality of pole slots 204 is formed in the rotor lamination 200, producing the plurality of salient rotor poles 206*a*–*d*. The pole slots 204 are formed so that the rotor poles 206 each have a face portion 208 that is substantially wider than a neck portion 209 of the pole 206. Two salient poles 206*a*, 206*c* have magnet retention slots 210 and 212 defined in their neck portions 209. The magnet retention slots 210 and 212 are substantially flat and parallel and are separated by a separating portion or layer 214 of the lamination material. These two salient poles 206*a*, 206*c* each have multiple buried permanent magnets 240 and 242 installed in the magnet retention slots 210 and 212 so that a consequent pole arrangement is provided.

Having interior magnets 240 and 242, the material of the rotor lamination 200 forms bridges 216 of interconnecting material toward both ends of the magnet retention slots 210 and 212. These bridges 216 provide structural support for the poles 206a, 206c but can also cause "shorting" of the magnets 240 and 242 in the retention slots 210 and 212. For example, a part of the magnetic flux exiting from a N-pole of the permanent magnets 240 and 242 in the slots 210 and 212 can pass through the bridges 216 to the S-pole of the same magnets 240 and 242. This part of magnetic flux passing through the bridges 216 never passes through the space external to the rotor lamination 200. Therefore, this magnetic flux never intersects with a stator of the disclosed machine, and no force for rotational driving of the rotor is generated with this flux. By minimizing the amount of magnetic flux passing through the bridges 216, the magnetic force of the magnets 240 and 242 in the slots 210 and 212 can be utilized with higher efficiency. The part of magnetic flux passing through the bridges 216 depends on the sectional area of the bridges 216. Thus, the sectional area of the bridges 216 is preferably selected to minimize the amount of magnetic flux passing therethrough yet maintain structural integrity of the rotor poles 206a, 206c.

Figure 9B:
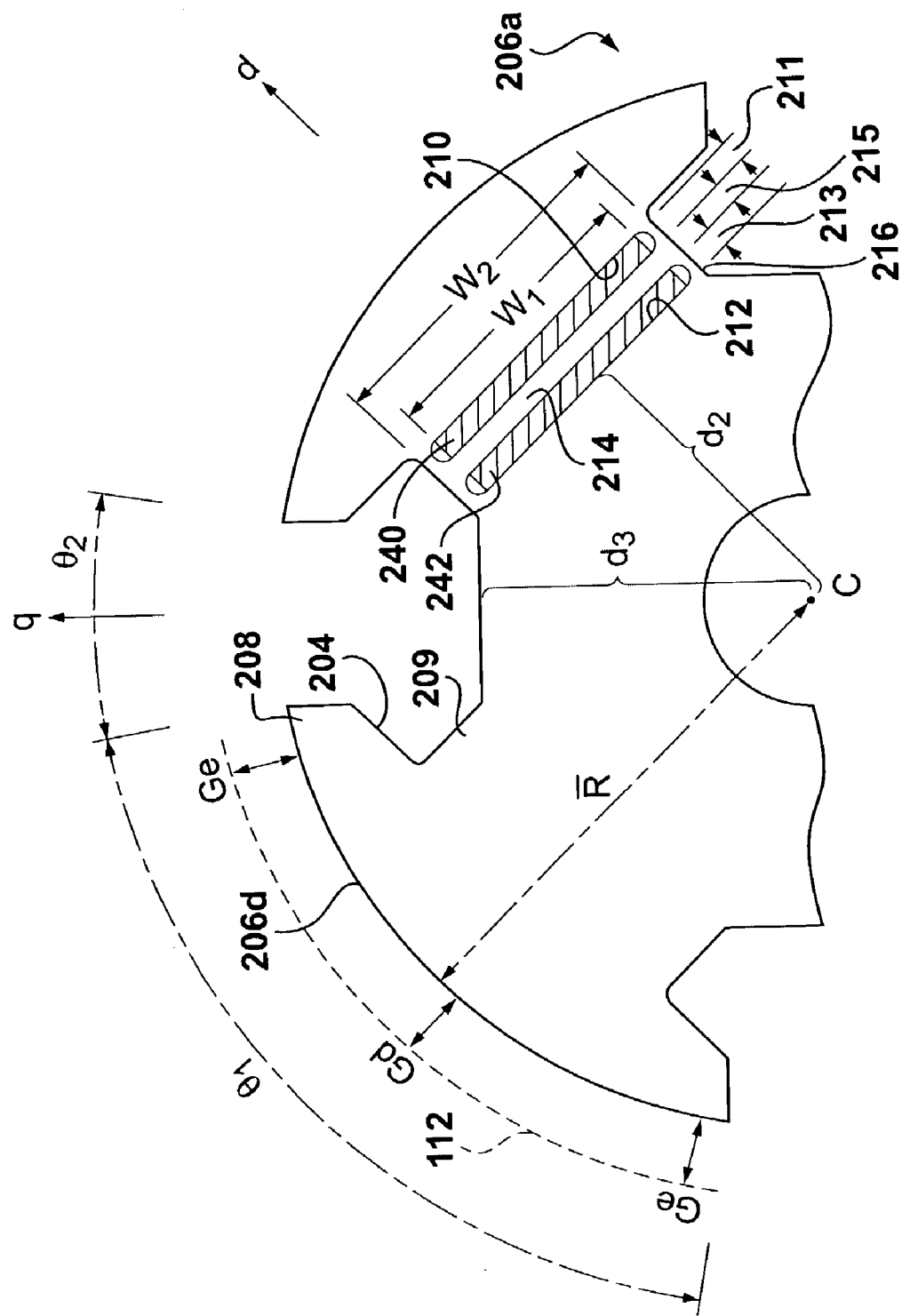

In FIG. 9B, a detail view of a pole slot 204 and two adjacent rotor poles 206a, 206d of the rotor lamination 200 of FIG. 9A is illustrated. The wide face portions 208 of the rotor poles 206 preferably define an angular width $\theta_1$ of approximately 60 to 75-degrees for a four-pole rotor having poles arranged at about every 90-degrees. The pole slots 204 preferably define a complimentary angular width $\theta_2$ of approximately 25 to 30-degrees between the widened face portions 208. These values are exemplary of a four-pole rotor as depicted in the present embodiment of FIGS. 9A–B. In general, it is preferred that the rotor poles have face portions defining an angular width $\theta_1$ of approximately 67 to 83% of the angular width of 360/n-degrees, and separated by the complimentary angular width $\theta_2$ of approximately 33 to 27% of the angular width of 360/n-degrees (where n is the number of salient poles formed in the rotor). The pole slots 204 that form the salient poles 206 of the rotor lamination 200 enhance the saliency of the poles 206. The use of multiple buried magnets 240 and 242 also helps to increase the saliency ratio of the salient rotor poles 206a, 206b having the permanent magnets 240 and 242 embedded therein. In addition, the separating portion or layer 214 between the slots 210 and 212 provides further structural support for the salient rotor poles with embedded magnets 240 and 242. In one embodiment of the rotor lamination 200, the salient rotor poles 206a–d of the rotor may have a saliency ration Xd:Xq of approximately 1.5 to 1.

To reduce the cogging torque of the disclosed machine, the face portions 208 of the rotor lamination 200 preferably have flared faces, which can reduce the cogging torque of the disclosed machine and can make the back EMF more sinusoidal. In FIG. 9B, the substantially uniform bore 112 formed by stator poles (not shown) of a stator assembly is depicted by dashed line. The pole faces of each face portion 208 are flared such that leading and trailing edges of the faces define a larger air gap Ge than the air gap Gd defined in the central region of the face portion 208. In one embodiment of the rotor lamination 200, the ratio between air gaps Ge:Gd can be approximately 1.5:1 to 3:1.

For the rotor lamination 200 having an approximate radius of 1.75-inch, the block magnets 240 and 242 for use in the slots 210 and 212 can have an exemplary height of approximately 0.057 to 0.068-inch. The block magnets 240 and 242 can also have a width of approximately 0.84-inch and can be as long as 1.1-inch. The block magnets 240 and 242 are typically smaller than the magnet retention slots 210 and 212 in which they are installed. The magnet retention slots 210 and 212 preferably have rounded ends and have a width $W_1$ beyond the width of the magnets 240 and 242. It is desirable that the separating portion or layer 214 between the slots 210 and 212 for the magnets be as small as possible to reduce a loss of magneto motive force at the magnets 240 and 242. However, it is also desirable that the separating portion or layer 214 be large enough to provide structural integrity of the poles and to increase the saliency of the poles. Preferably, the separation 215 of the layer between the slots 210 and 212 is at least three times the thickness of the rotor laminations 200, which is typically between about 0.018 to 0.035-inch thick.

When assembling the rotor assembly, the block magnets 240 and 242 are positioned through the magnet retention slots 210 and 212 on the salient rotor poles 206a, 206c as shown in FIG. 9A. Suitable magnets for use with the lamination 200 of the present embodiment include rare earth-neodymium magnets or rare earth-samarium cobalt magnets. The pole slots 204 that form the rotor poles 206a–d not only increase their saliency but also facilitate the initial magnetic aligning of the magnets when manufacturing the rotor assembly. For illustrative purposes, the locations where edge portions 176a and 176c of a cage assembly would contact the rotor lamination 200 if it were the last in the stack of laminations is shown in FIG. 9A with dotted lines. Because contact of the edge portions 176a, 176c is made near the faces of the face portions 208 of the poles 206a, 206c, the permanent magnets 240 and 242 must be embedded further into the body of the rotor lamination 200 so that the magnet retention slots 210 and 212 are distanced from the faces of these rotor poles 206a, 206c. This is in contrast to conventional magnets on permanent magnet machines that are typically positioned closer to or on the face of the rotor material. The further embedding of the permanent magnets 240 and 242 in the rotor lamination 200 of the present embodiment would make aligning the poles of the magnets during manufacture procedures difficult if it were not for the aforementioned benefit of the pole slots 204.

For illustrative purposes, a magnet aligning coil MC, such as used in the manufacture of a rotor assembly of the disclosed machine, is shown positioned in one of the pole slots 204. With the deeply defined pole slots 204, the flux lines from the coil MC used to orient the poles of the magnets 240 and 242 in the rotor poles 206a, 206c can more readily reach the further embedded magnets 240 and 242 in the magnet retention slots 210, 212. As best shown in FIG. 9B, the pole slots 204 are defined in the body of the rotor lamination 200 at a substantially equivalent depth as the further embedded magnet 242 in the magnet retention slots 212. In other words, the radial distance $d_2$ from a center C of the lamination 200 to the depth of the pole slot 204 is preferably substantially equivalent to the radial distance $d_3$ from the center C to the embedded magnet 242 in the retention slot 212.

As noted above, the embodiment of the disclosed machine 100 in FIG. 8 includes a plurality of support laminations 220 for supporting the cage 170. In FIG. 10A, an embodiment of a support lamination 220 for the cage 170 of FIG. 8 is illustrated in a plan view. The support lamination 220 is composed of a magnetic material, such as that used for the rotor laminations 200. The support lamination 220 defines a central opening 222 for mounting on the rotor shaft (not shown),. First and second ends 226a and 226c of the lamination 220 support at least one surface of the cage (not shown). For example, the ends 226a and 226c define arcuate surfaces for contacting and supporting an inner surface of the cage in FIG. 8. Preferably, the ends 226a and 226c support the cage at the edge portions (not shown) of the cage, which conserves space.

As with the rotor laminations 200 discussed above, the support lamination 220 defines magnet retention slots 230 and 232 for holding ends 241 and 243 of the multiple buried magnets. The magnet retention slots 230 and 232 are divided by a separating portion or layer 234 of the lamination material and have bridges 236 formed on either ends in a similar fashion as the rotor lamination 200 in FIGS. 9A–B. Because the support lamination 220 is composed of magnetic material, it may not be desirable that the support lamination 220 have a shape similar to the rotor laminations 200 discussed above. Preferably, the support lamination 220 has the same number of ends 226 as the number of salient rotor poles with embedded magnets and edge portions of the cage. In other words, it may be preferred that the support laminations 220 as in the present embodiment resemble a two-pole lamination for the disclosed four-rotor pole machine. Any "additional poles" of magnetic material on the support lamination 220 may act as salient poles that can "short out" a cage contacting the support lamination 220, reducing the utility of a flux controlling assembly of the disclosed machine.

In FIG. 10B, another embodiment of a support lamination 220' is illustrated in a plan view. The support lamination 220' in this embodiment is substantially similar to the support lamination 220 of FIG. 10A. To support the cage, however, the support lamination 220' defines recesses 228a and 228c in the ends 226a and 226c. When assembled in the disclosed machine, these recesses 228a and 228c receive the edge portions (not shown) that extend from the edge of the cage and can provide further support thereto.

Figure 11:
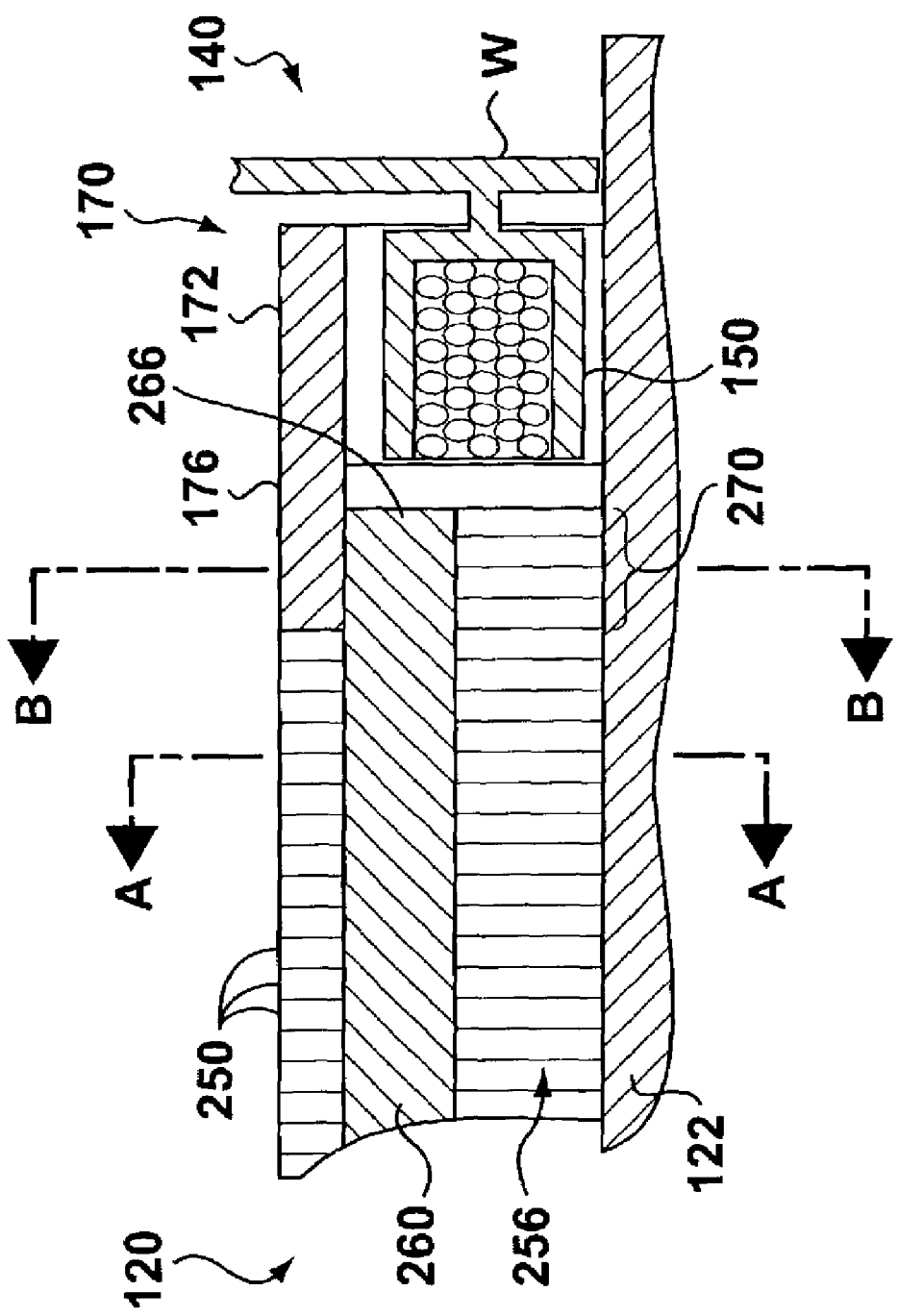
FIG. 11 illustrates a cross-sectional view of an embodiment of a modular assembly for a dynamoelectric machine according to certain teachings of the present disclosure having a magnet with an exposed end.
Figure 12B:
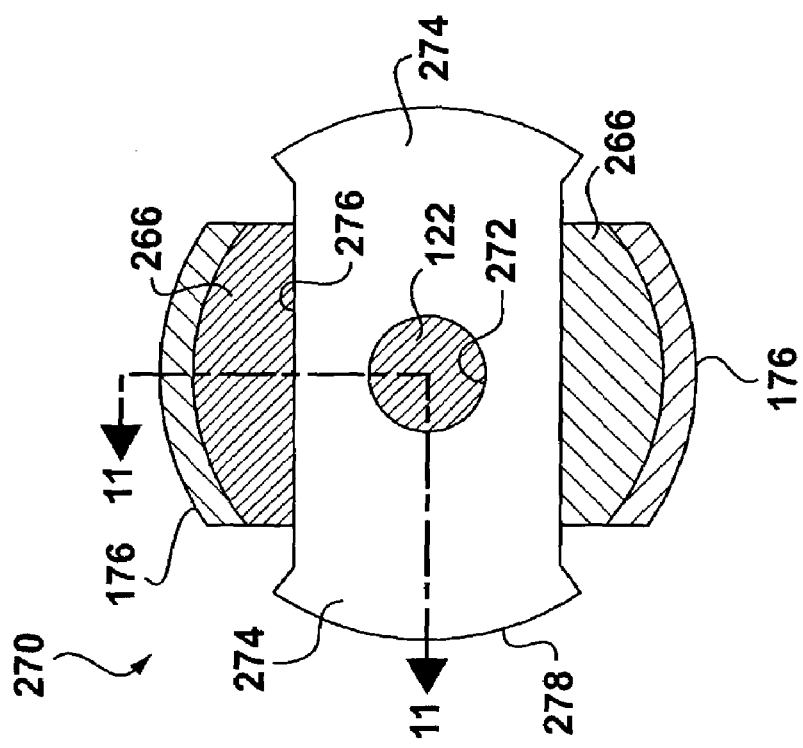
FIG. 12B illustrates another cross-sectional view of the disclosed machine of FIG. 11.

Referring to FIGS. 11–12B, components of yet another embodiment of a flux controllable permanent magnet dynamoelectric machine 100 according to certain teachings of the present disclosure are illustrated. The previous embodiments of the disclosed machine included structurally thin, magnetically strong magnets, such as rare earth-neodymium magnets or rare earth-samarium cobalt magnets, embedded in the rotor laminations. In contrast, the present embodiment of the disclosed machine 100 uses magnetically weaker permanent magnets 260, such as ferrite magnets. Because the permanent magnets 260 are relatively weaker, they are necessarily larger. Many of the components of the present embodiment of the disclosed machine 100 are substantially similar to those in previous embodiments so that the same reference numerals are used. Furthermore, certain operational characteristic of the disclosed machine 100 may be substantially similar to those of previous embodiments.

In the partial cross-sectional view of FIG. 11, a rotor pole 256 of the rotor assembly 120 is shown formed from a plurality of stacked rotor laminations 250 having a permanent magnet 260 embedded therein. An end 266 of the permanent magnet 260 extends beyond the stack of rotor laminations 250, and a plurality of support laminations 270 support the end 266 of the permanent magnet 260. An edge portion 176 of a cage 170 is supported on the end 266 of the permanent magnet 260 and is, therefore, also supported by the support laminations 270. A distal end of the edge portion 176 is in substantial contact with or touches the end of the stacked rotor laminations 250 of the rotor pole 256 having the embedded permanent magnet 260.

Figure 12A:
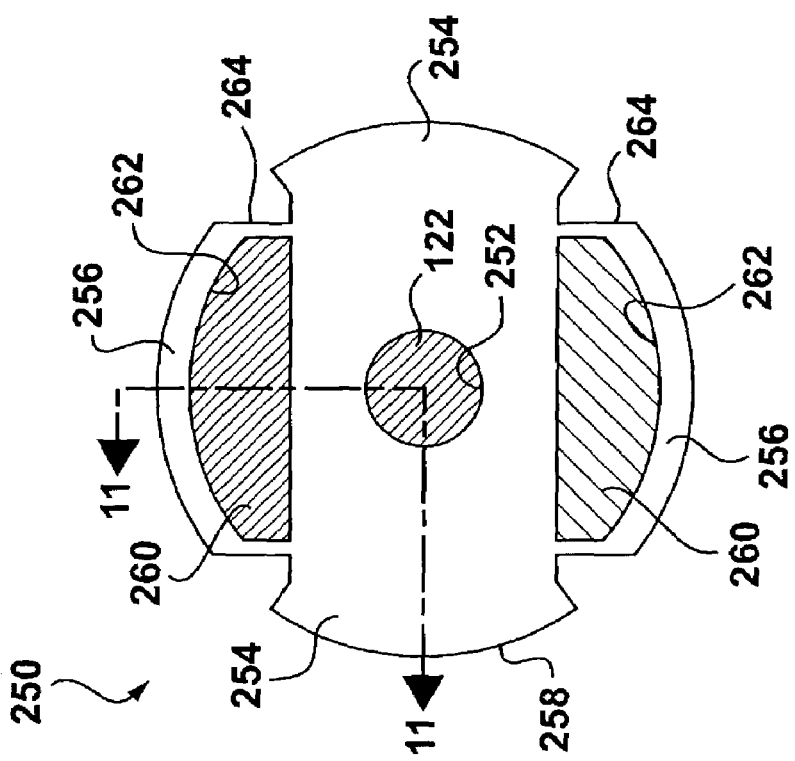
FIG. 12A illustrates a cross-sectional view of the disclosed machine of FIG. 11.

In FIG. 12A, a cross-sectional view of FIG. 11 along lines A—A shows a rotor lamination 250 for the disclosed machine of FIG. 11. The rotor lamination 250 includes a central opening 252 for the shaft 122 and includes two salient rotor poles 254. The rotor lamination 250 also has two salient rotor poles 256 each defining a magnet retention slot 262 for passage of the larger permanent magnets 260, which are bread loaf in shape. Even though a relatively large, bread loaf magnet 260 is used in the present embodiment, the fact that the salient rotor poles 254, 256 are formed form stacked rotor laminations 250 enables the face portions 258 of the rotor poles to be countered to improve the back EMF characteristics and to reduce the cogging torque of the disclosed machine. Because the permanent magnets 260 are embedded in the material of the rotor lamination 250, bridges 264 of the lamination material formed on the sides of the permanent magnets 260 are properly dimensioned to prevent shorting of the magnets 260 yet maintain structural integrity of the rotor poles 256. In one embodiment of the disclosed machine, the rotor lamination 250 may define a radius of approximately 1⅝-inch from a center to the pole faces 258. The magnet retention slots 262 may define a maximum height of approximately 0.6-inch along this radius. The bridges 264 towards the sides of the magnets 260 may define a height of approximately 0.3-inch and a width of approximately 0.03-inch.

In FIG. 12B, a cross-sectional view of FIG. 11 along lines B—B shows a support lamination 270 for supporting the exposed ends 266 of the permanent magnets 260 and the edge portions 176 of the cage. The support lamination 270 defines a central opening 272 for the shaft 122 and includes salient rotor poles 274. The ends 266 of the permanent magnets 260 are supported on the support lamination 270 at 276. In the present embodiment, the support lamination 270 only includes a bottom portion or surface on which the bottom of the permanent magnet 260 positions. Alternatively, the support laminations 270 can also include side portions and can include top portions for further enclosing the permanent magnet 260. The curved under sides of the edge portions 176 of the cage 170 are supported on a portion of the arced surface of the permanent magnet 260.

In the embodiments of FIGS. 2–12B, rotor assemblies of the modular assemblies having consequent-pole structures have been disclosed. For example, rotor assemblies have been disclosed with four salient rotor poles, two of which have one or more permanent magnets embedded therein. Consequently, cages of the flux controlling assemblies have been disclosed with two edge portions, one for each salient rotor pole having a magnet embedded therein. In general, however, a rotor assembly according to certain teachings of the present disclosure can have a plurality of salient rotor poles and can have a plurality of salient rotor poles with one or more magnets embedded therein. Therefore, a cage of a flux controlling assembly can also include a plurality of edge portions for contacting each of the rotor poles having permanent magnets. It is preferred that each rotor pole having an embedded permanent magnet also be in contact with a corresponding edge portion of a cage, which provides symmetry to the disclosed machine and which prevents potential canceling out of diverted flux controllable by the flux controlling assembly. In addition, it is preferred that each permanent magnet for the rotor poles in contact with a single flux controlling assembly have the same polarity orientation. Furthermore, it is preferred that the embedded permanent magnets be symmetrically and alternatingly arranged about at least half of the salient rotor poles of the rotor assembly. For example, for a rotor assembly of the disclosed machine having six rotor poles, it is preferred that three, alternating rotor poles be provided with permanent magnets of the same polarity orientation and that the cage then have three edge portions for contacting these three rotor poles with embedded magnets. The same symmetry can therefore be applied to other embodiments of the disclosed machine having 8, 10, 12, or more salient rotor poles and a single flux controlling assembly.

Figure 13:
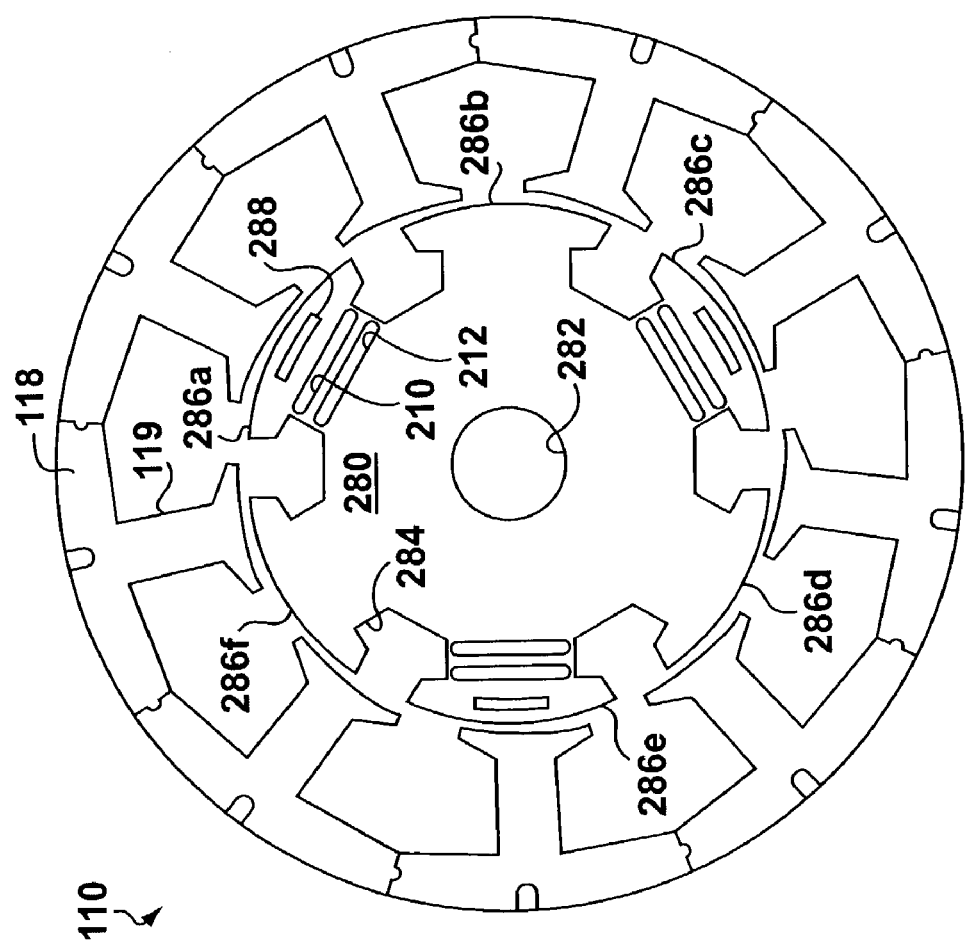
FIG. 13 illustrates a plan view of embodiments of a six-pole lamination and segmented stator lamination for a dynamoelectric machine according to certain teachings of the present disclosure.
Figure 14C:
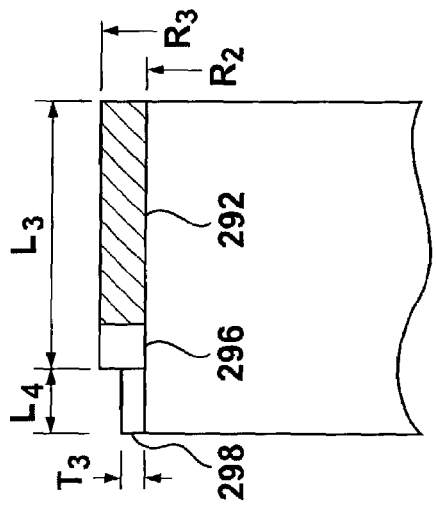
FIGS. 14A–C illustrate various views of an embodiment of a cage for the disclosed machine of FIG. 13.

Referring to FIGS. 13–14C, components of another embodiment of a flux controllable permanent magnet dynamoelectric machine 100 according to certain teachings of the present disclosure are illustrated. In FIG. 13, an embodiment of a six-pole lamination 280 for the disclosed machine 100 is illustrated in plan view and is shown positioned in an embodiment of a stator lamination 110. The stator lamination 110 of the present embodiment is formed from a plurality of segments 118 with each having a stator tooth 119. Therefore, a stator assembly for the disclosed machine can be formed in a segmented fashion with the plurality of stator segments coupled together by known techniques. In the present example, nine segments are illustrated so that the stator lamination 110 includes nine inwardly salient stator teeth 119. The segmented stator lamination 110 is stacked with other such stator laminations to form a stator assembly for the disclosed machine. A concentrated winding technique is preferably used for windings of the stator assembly. Teachings of suitable concentrated winding techniques are disclosed in U.S. patent application Ser. No. 10/229,506, filed Aug. 28, 2002 and entitled "Permanent Magnet Machine," which is incorporated herein by reference.

The lamination 280 for the disclosed machine is shown positioned within the internal bore of the stator lamination 110. The lamination 280 defines an opening 282 for mounting on the rotor shaft (not shown). The lamination 280 also defines a plurality of pole slots 284 so that the lamination 280 includes six salient rotor poles 286a–f. Three, alternate rotor poles 286a, 286c, and 286e define magnet retention slots 210 and 212 for holding multiple buried magnets (not shown) therein. Furthermore, the alternate rotor poles 286a, 286c, and 286e each define a support retention slot 288 therein for supporting a cage, such as disclosed below. Such support retention slots 288 are provided in the lamination 280 when it used to support the cage of a flux controlling assembly. Consequently, only laminations 280 adjacent an end of a rotor assembly may have such support retention slots 288 formed therein. Other lamination of the disclosed machine may be substantially similar to the lamination 280 shown in FIG. 13 but may not define support retention slots.

Figure 14B:
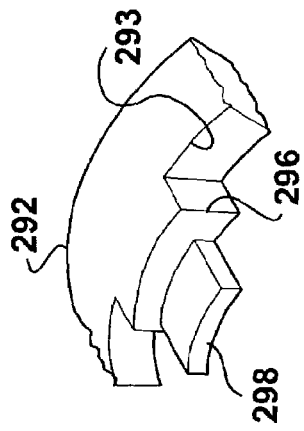
Figure 14A:
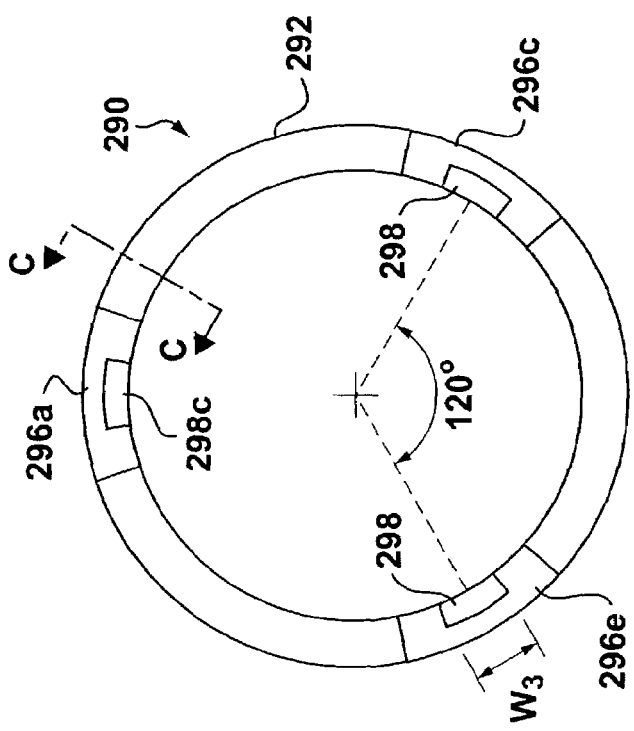

Referring to FIGS. 14A–C, an embodiment of a cage 290 for the disclosed machine having laminations 280 of FIG. 13 is illustrated in various views. In the end view of FIG. 14A, the cage 290 includes a tubular body portion 292 and includes three edge portions 296a, 296c, 296e positioned at about every 120-$d$ degrees around the circumference of the tubular body portion 292. Each edge portion 296a, 296c, 296e includes a support member or axial connector 298 integrally formed thereon. As best shown in the partial perspective view of FIG. 14B, the edge portion 296 extends from the circumferential edge 293 of the tubular body portion 292 and preferably has the same thickness of the body portion 292. The support member 290 extends from the distal end of the edge portion 296 and preferably has a thickness less than the edge portion 296. In addition, the support member 298 preferably has an arcuate end-section similar to the edge portion 296, although this is not strictly necessary. To support the cage 290 on the rotor assembly, these support members 298 fit into support retention slots 288 in laminations 280 of FIG. 13.

Exemplary dimension of the disclosed cage 290 will be discussed. As best shown in the partial cross-section of FIG. 14C, an inner cylindrical wall of the cage 290 has a radius $R_2$ of about 1.408-inch from the center of the tubular body portion 292, and an outer cylindrical wall has a radius $R_3$ of about 1.528-inch. Thus, the thickness of the tubular body portion 292 is approximately 0.120-inch. The length $L_3$ of the tubular body portion 292 and the edge portion 296 is approximately 1.68-inch with the edge portion 296 extending preferably about 0.150-inch of that length $L_3$. The length $L_4$ that the support member 298 extends is approximately 0.350-inch. Therefore, the support members 298 preferably fits with in support retention slots 288 formed in a number of laminations 280 of the rotor assembly shown in FIG. 13. The remaining laminations 280 of the rotor assembly therefore, do not require support retention slots. The thickness $T_3$ of the projecting member 298 is preferably less than the thickness of 0.120-inch of the tubular body portion 292. As best shown in FIG. 14A, the width $W_3$ of the support members 298 is approximately 0.395-inch. It is understood that these dimensions are only exemplary for a particular implementation of the disclosed machine.

Figure 15:
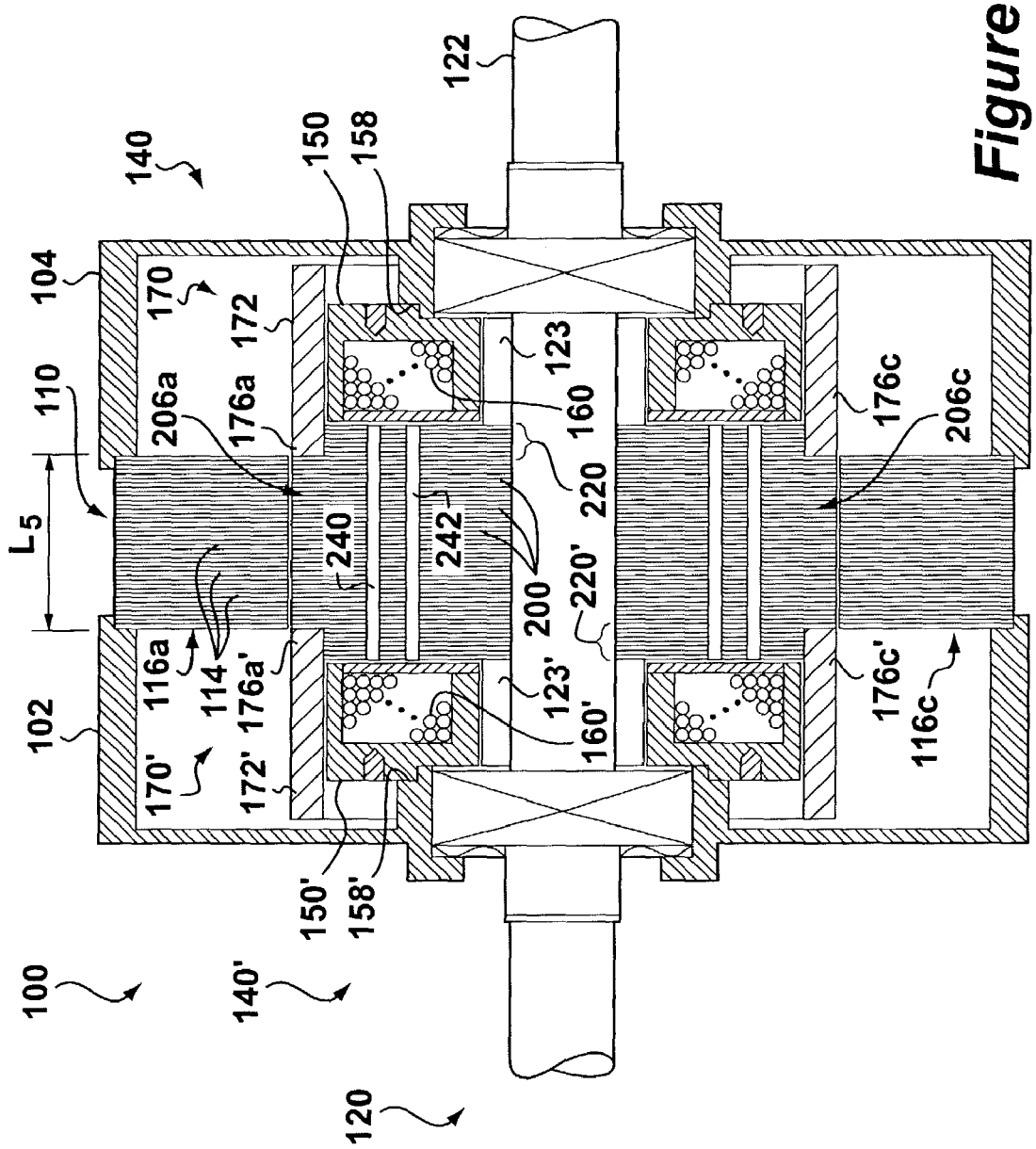
FIG. 15 illustrates a cross-sectional view of an embodiment of a flux controllable permanent magnet dynamoelectric machine having a consequent pole arrangement and dual flux controlling assemblies.

In the embodiments of FIGS. 2–14C, embodiments of modular assemblies for a flux controllable permanent magnet dynamoelectric machine have been described and shown having only one flux controlling assembly used with a rotor assembly. Referring to FIG. 15, an embodiment of a flux controllable permanent magnet dynamoelectric machine 100 having a consequent pole arrangement and dual flux controlling assemblies 140 and 140' is illustrated in a cross-sectional view. Many of the components of the present embodiment of the disclosed machine 100 are substantially similar to those in previous embodiments so that the same reference numerals are used. Certain operational characteristics of the disclosed machine 100 may be substantially similar to those of previous embodiments.

Rotor laminations 200 mounted on the shaft 122 have four outwardly salient rotor poles (only two poles 206a, 206c are shown in the partial cross-sectional view can be substantially similar to those disclosed above with reference to FIGS. 9A–B. The stack of rotor laminations 200 and the stack of stator laminations 114 can have an axial length $L_5$ of about 0.950-inch. The salient rotor poles 206a and 206c each have multiple buried permanent magnets 240 and 242 embedded in layers therein, while the other salient rotor poles do not have magnets. Thus, the rotor laminations 200 have a consequent pole arrangement.

In contrast to previous embodiments, however, the disclosed machine 100 of FIG. 15 includes dual flux controlling assemblies 140 and 140' instead of only one assembly as described in other disclosed embodiments. The flux controlling assemblies 140 and 140' include mounting fixtures 150 and 150', coils 160 and 160', and cages 170 and 170' mounted on the ends of the rotor 120. Edge portions 176a and 176c of the first cage 170 respectively make substantial contact with the rotor laminations 200 at one end of the rotor poles 206a and 206c. Likewise, edge portions 176a ' and 176c ' of the second cage 170' respectively make substantial contact with the rotor laminations 200 at another end of the same rotor poles 206a and 206c. Both flux controlling assemblies 140 and 140', therefore, can be used to control the flux of the same rotor poles 206a and 206c. The cages 170 and 170' are supported on the ends of the rotor 120 by a plurality of support laminations 220 and 220', such as disclosed above with reference to FIGS. 10A–B. Preferably, sleeves 123 and 123' are mounted on the shaft 122 on both sides of the stack of rotor laminations 200. As noted above, the sleeves 123 and 123' increases the air gap permeance with the mounting fixtures 150 and 150' and reduces the flux density of the shaft 122.

When operating the disclosed machine 100 with dual assemblies 140 and 140', the current supplied to control the flux can be distributed to the coils 160 and 160'. By distributing the current to the two coils 160 and 160', the disclosed machine 100 has twice the copper area. To achieve the same amount of flux control, each coil requires only half the current that would normally be required in a machine having only one flux controlling assembly. Therefore, the disclosed machine 100 having the dual cage arrangement in the present embodiment can advantageously have about half the copper losses compared to a machine having only one flux controlling assembly.

The disclosed machine 100 of FIG. 15 further includes a preferred arrangement for the mounting fixtures 150, 150' and coils 160, 160' to facilitate their manufacture and heat transfer characteristics. Referring to FIGS. 16A–B, a preferred arrangement of a mounting fixture 150 and a coil 160 for use with the disclosed machines is illustrated a side cross-sectional and a frontal view. The arrangement includes a plate 180 and a bobbin 188 for facilitating manufacture of the assembly and improving heat transfer characteristics. The bobbin 188 defines a ring having an inner wall and two sidewalls and is preferably composed of plastic or the like. When manufacturing the assembly, the wire for the coil 160 is first wound around the bobbin 188 separate from the fixture 150. This allows for precision winding of the coil 160 to improve the density or fill of the coil when installed in the mounting fixture 150. In addition, the coil 160 wound in the bobbin 188 can be vacuum pressure impregnated with varnish or other material to improve the thermal characteristics of the wound coil 160.

The mounting fixture 150 is composed of magnetic material and defines an annular space 154 for positioning the bobbin 188 and coil 160. Use of the bobbin 188 facilitates the installation of the coil 160 in the annular space 150. Tape or other techniques can be applied over the wire of the coil 160 for insulation between the wires of the coil 160 and the metal fixture 150. Once the bobbin 188 and coil 160 are installed, the plate 180 is attached to fixture 150 to hold the bobbin 188 and the coil 160. In FIG. 17, the plate 180 is illustrated before attachment to the mounting fixture 150. The plate 180 is composed of a non-magnetic material. Preferably, the non-magnetic plate 180 is beveled or bent inward toward its periphery. Therefore, when the plate 180 is attached to the mounting fixture 150, it can push on the coil 160 as it is flattened, improving the density or fill of the coil 160 and conserving space in the dynamoelectric machines of the present disclosure. The non-magnetic plate 180 also improves the thermal characteristics of the assembly. One or more fasteners 185, such as a screw, rivet, drive screw, swedge pin, or the like are used to attach the plate 180 to the mounting fixture 150. The plate 180 defines an inner opening 182 substantially equivalent in dimension to the inner diameter 153 of the mounting fixture.

Figure 18:
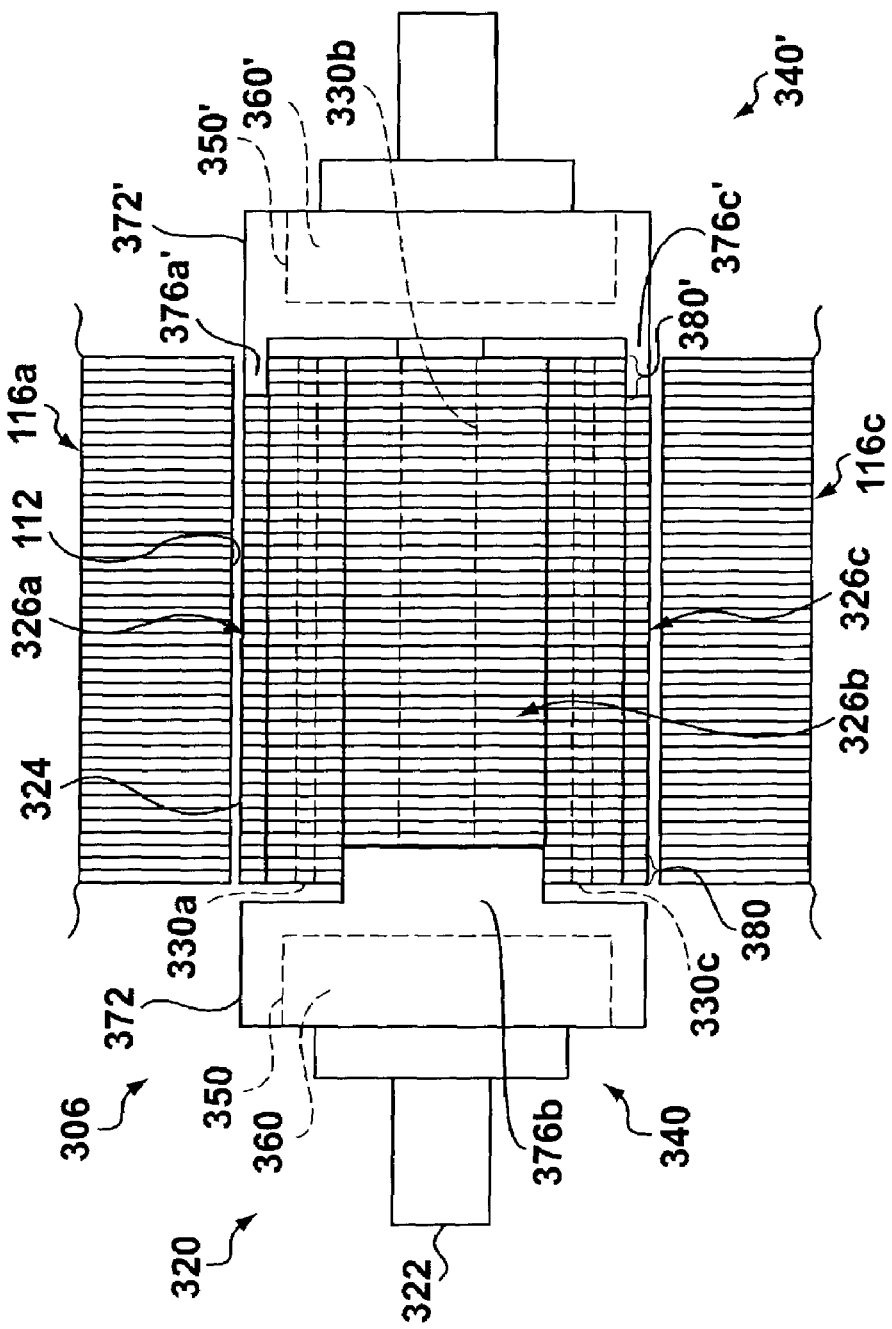
FIG. 18 illustrates a side view of an embodiment of a flux controllable permanent magnet dynamoelectric machine having a non-consequent pole arrangement and dual flux controlling assemblies.
Figure 19:
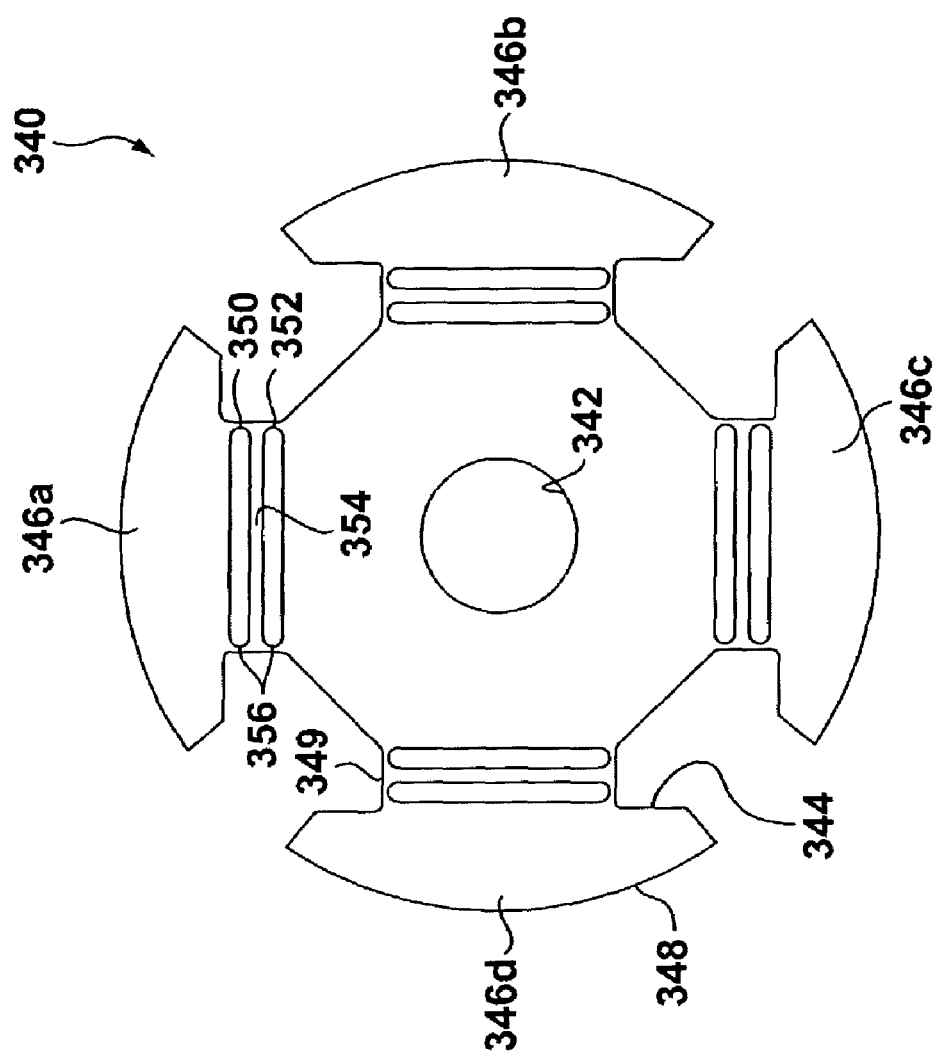
FIG. 19 illustrates a plan view of an embodiment of a lamination for the rotor assembly of FIG. 18 with non-consequent rotor poles and multiple buried magnets.

Referring to FIGS. 18–19, components of another embodiment of a flux controllable permanent magnet dynamoelectric machine 100 according to certain teachings of the present disclosure is illustrated. In the side view of FIG. 18, an embodiment of a modular assembly 306 for the disclosed machine is illustrated. As with previous embodiments, the modular assembly 306 includes a rotor assembly 320 having a rotor shaft 322 and salient rotor poles 326 (four in the present example) formed from a plurality of stacked rotor laminations 324. The salient rotor poles 326 each have one or more magnets 330 embedded therein sot that the rotor assembly 320 has a non-consequent pole arrangement. The rotor pole 326a has one or more permanent magnets 330a, the rotor pole 326b has one or more permanent magnets 330b, the rotor pole 326c has one or more permanent magnets 330c, and another pole (not visible) also has one or more permanent magnets (not visible).

In FIG. 19, an embodiment of a rotor lamination 340 for the rotor assembly 320 of FIG. 18 with non-consequent pole arrangement and multiple buried magnets (not shown) is illustrated in a plan view. The rotor lamination 340 defines a central opening 342 for the rotor shaft (not shown) and defines a plurality of pole slots 344 forming four salient rotor poles 346a–d. Of course, the lamination 340 can also have more than four poles. As with previous embodiments, the salient rotor poles 326a–d are formed to have wide face portions 348 and narrow neck portions 349. All of the salient rotor poles 346a–d are substantially identical. Each salient rotor pole 346a–d has dual magnet retention slots 350 and 352 defined in the neck portions 349 for holding multiple buried magnets (not shown), such as rare earth-neodymium magnets or rare earth-samarium cobalt magnets and has a separating portion 356 of interconnecting material. The pole slots 204 that form the salient rotor poles 346a–d are deeply defined to increase the saliency and facilitate the initial magnetic aligning of the permanent magnets when manufacturing the rotor assembly. In the present embodiment, the permanent magnets are arranged such that the polarity orientation of one rotor pole is opposite the polarity orientation of the permanent magnets on each adjacent rotor pole such that the magnets establish magnetic poles at the exterior of the rotor assembly of alternating polarities.

As with the embodiment of FIG. 15, the modular assembly 306 of FIG. 18 has two flux controlling assemblies 340 and 340'. In the present embodiment of the disclosed assembly 306, however, the rotor 320 has a non-consequent pole arrangement, and the flux controlling assemblies 340 and 340' are arranged to control the flux of alternating sets of rotor poles. A first assembly 340 is disposed adjacent one end of the rotor laminations 324. The first assembly 340 is used for a first set of salient rotor poles 326, including pole 326b and another pole (not visible) having magnets 330 of one polarity orientation. A second assembly 340' is disposed adjacent the other end of the rotor laminations 324 and is used for the remaining set of salient rotor poles 326a, 326c having magnets 330a, 330c of another polarity orientation. The flux controlling assemblies 340 and 340' each include mounting fixtures 350 and 350', coils 360 and 360', and cages 370 and 370'.

The cage 350 of the first flux controlling assembly 340 (on the left side of the laminations in FIG. 18) has two edge portions, including edge portion 376b that extends to rotor pole 326b and another edge portion not visible in FIG. 15 extending to an opposing rotor pole also not visible. The cage 350' of the second flux controlling assembly 340' (on the right side of the laminations in FIG. 18) has two edge portions, including edge portion 376a that extends to rotor pole 326a and edge portion 376c that extends to the opposing rotor pole 326c. In the dual cage, non-consequent pole arrangement of FIG. 18, the two DC coils 360 and 360' can be used to beneficially spread out copper losses and reduce inductance compared to the single cage, consequent pole arrangements disclosed in previous embodiments.

For illustrative purposes, rotor poles 116a and 116c are shown relative to the rotor assembly 320. With the two flux controlling assemblies 340 and 340', it is possible to reduce the stack length of rotor laminations 324. In particular, the rotor assembly 320 can be constructed with fewer rotor laminations 324 so that the edge portions 376 of the cages 370 and 370' are partially disposed within the bore 112 formed by the stator poles 116. Preferably, the edge portions 376 and 376' are not disposed in the bore 112 a distance greater than their lengths, which can be about 0.150-inch for each edge portion 376. Therefore, it may be possible to reduce the total stack length of the rotor laminations 324 by about a maximum amount of 0.300-inch, for example, which would include both lengths of edge portions 376 and 376'. This could reduce the stack length by as much as fifteen laminations, for example. Being able to reduce the total stack length of the rotor laminations 324 can result in a reduced size of the overall machine, which can be advantageous. If the stack length is reduced more than the length of the edge portions 376 and 376', however, then the tubular portions 372 and 372' of the cages 370 and 370' will be partially disposed in the bore 112 formed by the stator poles 116, which can short out the cages by allowing flux to transfer between the cages and the stator poles.

The foregoing description of preferred and other embodiments is not intended to limit or restrict the scope or applicability of the inventive concepts that were conceived by the Applicant. In exchange for disclosing the inventive concepts contained herein, the Applicant desires all patent rights afforded by the appended claims. Therefore, it is intended that the invention include all modifications and alterations to the full extent that they come within the scope of the following claims or the equivalents thereof.

What is claimed is:

1. A flux controllable electromagnetic machine, comprising:
    a rotor having a shaft and a plurality of salient rotor poles, the plurality of salient rotor poles having a consequent pole arrangement and including a plurality of first salient rotor poles each having a permanent magnet embedded therein, and a plurality of second salient rotor poles without permanent magnets;
    a coil for controlling flux being disposed about the shaft; and
    a cage for transferring flux being disposed about the coil, a portion of the cage being in substantial contact with at least one of the first salient rotor poles.

2. The machine of claim 1, wherein the rotor comprises a plurality of rotor laminations mounted on the shaft.

3. The machine of claim 2, wherein the rotor laminations define magnet retention slots for the permanent magnets.

4. The machine of claim 2, further comprising a conductor positioned through one or more of the rotor laminations in one of the first salient rotor poles.

5. The machine of claim 1, wherein the cage comprises a body having a first surface adjacent an end of one of the first salient rotor poles and having a second surface adjacent the coil.

6. The machine of claim 5, wherein the portion of the cage in substantial contact with said at least one of the first salient rotor poles comprises an extension of the first surface of the body towards the end of said at least one of the first salient rotor poles.

7. The machine of claim 1, further comprising a support member supporting the cage on the rotor.

8. The machine of claim 7, wherein the support member is mounted on the shaft of the rotor and supports at least one surface of the cage thereon.

9. The machine of claim 7, wherein the support member comprises a plurality of support laminations.

10. The machine of claim 9, wherein the support laminations comprise a magnetic material.

11. The machine of claim 9, wherein the support laminations define magnet retention slots for an end of one of the permanent magnets.

12. The machine of claim 7, wherein the support member comprises a plurality of support laminations mounted on the shaft and supporting an end of one of the permanent magnets thereon, and wherein the end of one of the permanent magnets supports at least one surface of the cage thereon.

13. The machine of claim 7, wherein the support member is connected between the cage and one of the first salient rotor poles.

14. The machine of claim 13, wherein the support member has one end disposed in a first retention slot at least partially defined in said one of the first salient rotor poles.

15. The machine of claim 14, wherein the support member has another end integrally connected to the portion of the cage.

16. The machine of claim 14, wherein the support member has another end disposed in a second retention slot in the portion of the cage.

17. The machine of claim 1, wherein each permanent magnet is selected from the group consisting of a ferrite magnet, an alnico magnet, a praseodymium alloy magnet, a rare earth-neodymium magnet, a rare earth-samarium cobalt magnet, and a neodymium-iron-boron compound.

18. The machine of claim 1, wherein each permanent magnet comprises a block magnet having a substantially rectilinear cross-section.

19. The machine of claim 1, wherein each permanent magnet comprises first and second permanent magnets embedded adjacent one another in one of the first salient rotor poles.

20. The machine of claim 19, wherein a first radial distance from a center of the rotor to the first permanent magnet of the layer is approximately equal to a second radial distance from the center of the rotor to an edge where a pole slot in the rotor defines the rotor pole.

21. The machine of claim 19, wherein a pole slot in the rotor defines the rotor pole and receives a magnetizing coil for orienting the first and second permanent magnets during manufacture of the rotor, and wherein the pole slot allows flux lines from the magnetizing coil to pass substantially perpendicular to the permanent magnets embedded in the rotor pole.

22. The machine of claim 19, wherein the first and second permanent magnets are separated by a layer of material of said one of the first salient rotor poles.

23. The machine of claim 1, wherein the cage comprises a plurality of first portions being in substantial contact with a plurality of the first salient rotor poles.

24. The machine of claim 1, further comprising:
    a second coil for controlling flux being disposed about the shaft adjacent another end of the rotor; and
    a second cage for transferring flux being disposed about the second coil and having a plurality of second portions being in substantial contact with at least one of the first salient rotor poles.

25. The machine of claim 1, wherein the cage comprises a plurality of first portions being in substantial contact with the plurality of first salient rotor poles.

26. The machine of claim 1 further comprising a stator, and wherein the permanent magnets extend in an axial direction beyond at least one axial end of the stator.

27. A flux controllable electromagnetic machine, comprising:
- a rotor having a shaft and having a plurality of rotor laminations mounted on the shaft, the rotor laminations defining a plurality of salient rotor poles;
- said plurality of salient rotor poles having a consequent pole arrangement and including a plurality of first salient rotor poles each having at least one permanent magnet embedded therein and a plurality of second salient rotor poles without permanent magnets;
- a stationary coil for controlling flux being disposed about the shaft adjacent an end of the rotor; and
- a rotatable cage for transferring flux being disposed about the coil, at least two portions of the cage each being in substantial contact with the end of the rotor on a respective one of the first salient rotor poles.

28. The machine of claim 27, wherein the plurality of rotor laminations define magnet retentions slots for the magnets.

29. The machine of claim 27, further comprising a conductor positioned through one or more of the rotor laminations in at least two of the first salient rotor poles.

30. The machine of claim 27, wherein the cage comprises a body having an edge adjacent the end of the rotor and having an inner surface adjacent the coil.

31. The machine of claim 30, wherein the at least two portions of the cage each comprise an extension of the edge of the body towards the end of the rotor at a respective one of the first salient rotor poles.

32. The machine of claim 27, further comprising a support member supporting the cage on the rotor.

33. The machine of claim 32, wherein the support member is mounted on the shaft of the rotor and supports at least one surface of the cage thereon.

34. The machine of claim 32, wherein the support member comprises a plurality of support laminations.

35. The machine of claim 34, wherein the support laminations comprise a magnetic material.

36. The machine of claim 34, wherein the support laminations define magnet retention slots for ends of the permanent magnets.

37. The machine of claim 32, wherein the support member comprises a plurality of support laminations mounted an the shaft and supporting ends of the permanent magnets thereon, and wherein the ends of the permanent magnets support an inner surface of the cage thereon.

38. The machine of claim 32, wherein the support member comprises a connector connected between the portion of the cage and at least one of the first salient rotor polee.

39. The machine of claim 38, wherein the connector has one end disposed in a first retention slot at least partially defined in said at least one of the first salient rotor poles.

40. The machine of claim 39, wherein the connector has another end integrally connected to the portion of the cage.

41. The machine of claim 39, wherein the connector has another end disposed in a second retention slot in the portion of the cage.

42. The machine of claim 27, wherein the permanent magnets are selected from the group consisting of a ferrite magnet, an alnico magnet, a praseodymium alloy magnet, a rare earth-neodymium magnet, a rare earth-samarium cobalt magnet, and a neodymium-iron-boron compound.

43. The machine of claim 27, wherein each permanent magnets comprises a block magnets having a substantially rectilinear cross-section.

44. The machine of claim 27, wherein each permanent magnet comprises first and second permanent magnets embedded adjacent one another in each of at least two of the first salient rotor poles.

45. The machine of claim 44, wherein a first radial distance from a center of the rotor to the first permanent magnet is approximately equal to a second radial distance from the center of the rotor to an edge where a pole slot in the rotor defines the rotor pole.

46. The machine of claim 44, wherein a plurality of pole slots in the rotor define the salient rotor poles and receive a magnetizing coil for orienting the first and second permanent magnets during manufacture of the rotor, and wherein the pole slots allow flux lines from the magnetizing coil to pass substantially perpendicular to the permanent magnets embedded in the first salient rotor poles.

47. The machine of claim 44, wherein the first and second permanent magnets are separated by a layer of material of the rotor laminations.

48. The machine of claim 47, wherein the layer is approximately at least three times the width of one rotor lamination.

49. The machine of claim 48, wherein the cage has a plurality of first portions being in substantial contact with the first salient rotor poles.

50. The machine of claim 27, wherein the cage has a plurality of first portions being in substantial contact with the first salient rotor poles.

51. The machine of claim 27, further comprising:
- a second coil for controlling flux being disposed about the shaft adjacent another end of the rotor; and
- a second cage for transferring flux being disposed about the second coil and having a plurality of second portions being in substantial contact with the first salient rotor poles.

52. The machine of claim 27 further comprising a stator, and wherein the permanent magnets extend in an axial direction beyond at least one axial end of the stator.

* * * * *